(12) United States Patent
Hahn et al.

(10) Patent No.: US 10,305,644 B2
(45) Date of Patent: May 28, 2019

(54) METHOD AND APPARATUS FOR TRANSMITTING AND RECEIVING DATA BASED ON A MEASUREMENT GAP IN A WIRELESS COMMUNICATION SYSTEM

(71) Applicant: LG ELECTRONICS INC., Seoul (KR)

(72) Inventors: Genebeck Hahn, Seoul (KR); Heejeong Cho, Seoul (KR); Eunjong Lee, Seoul (KR); Jiwon Kang, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 170 days.

(21) Appl. No.: 15/337,359

(22) Filed: Oct. 28, 2016

(65) Prior Publication Data

US 2017/0127397 A1    May 4, 2017

Related U.S. Application Data

(60) Provisional application No. 62/248,322, filed on Oct. 30, 2015, provisional application No. 62/297,144, filed on Feb. 19, 2016.

(51) Int. Cl.
| | |
|---|---|
| H04W 28/02 | (2009.01) |
| H04L 5/00 | (2006.01) |
| H04W 88/02 | (2009.01) |
| H04W 88/08 | (2009.01) |
| H04L 1/00 | (2006.01) |
| H04L 12/875 | (2013.01) |
| H04W 72/04 | (2009.01) |

(52) U.S. Cl.
CPC .......... *H04L 5/0007* (2013.01); *H04L 5/0053* (2013.01); *H04W 28/0236* (2013.01); *H04L 1/0018* (2013.01); *H04L 47/56* (2013.01); *H04W 72/042* (2013.01); *H04W 88/02* (2013.01); *H04W 88/08* (2013.01)

(58) Field of Classification Search
CPC .... H04B 7/18545; H04W 64/00; H04W 8/26; H04W 80/04; H04W 28/0236; H04L 1/0018; H04L 47/56
See application file for complete search history.

(56) References Cited

U.S. PATENT DOCUMENTS

| | | | |
|---|---|---|---|
| 2013/0107743 A1* | 5/2013 | Ishii | H04L 5/001 370/252 |
| 2013/0130698 A1* | 5/2013 | Laitinen | H04W 36/32 455/441 |
| 2014/0200002 A1* | 7/2014 | Vangala | H04W 52/0225 455/436 |

* cited by examiner

*Primary Examiner* — Salvador E Rivas
(74) *Attorney, Agent, or Firm* — Lee, Hong, Degerman, Kang & Waimey

(57) ABSTRACT

The present disclosure provides a method for transmitting and receiving data in a wireless communication system. Particularly, the method performed by a user equipment (UE) includes performing a measurement in a measurement gap; receiving a first indication information that instructs to report a mobility state of the UE from a base station (BS); transmitting a second indication information that represents a mobility state to the BS; receiving control information related to a configuration change of the measurement gap from the BS; and transmitting and receiving data for a specific service with the BS in whole or a specific section of the measurement gap based on the received control information, thereby satisfy the requirement of low latency/high reliability requested in 5G.

20 Claims, 21 Drawing Sheets

[Figure 1]
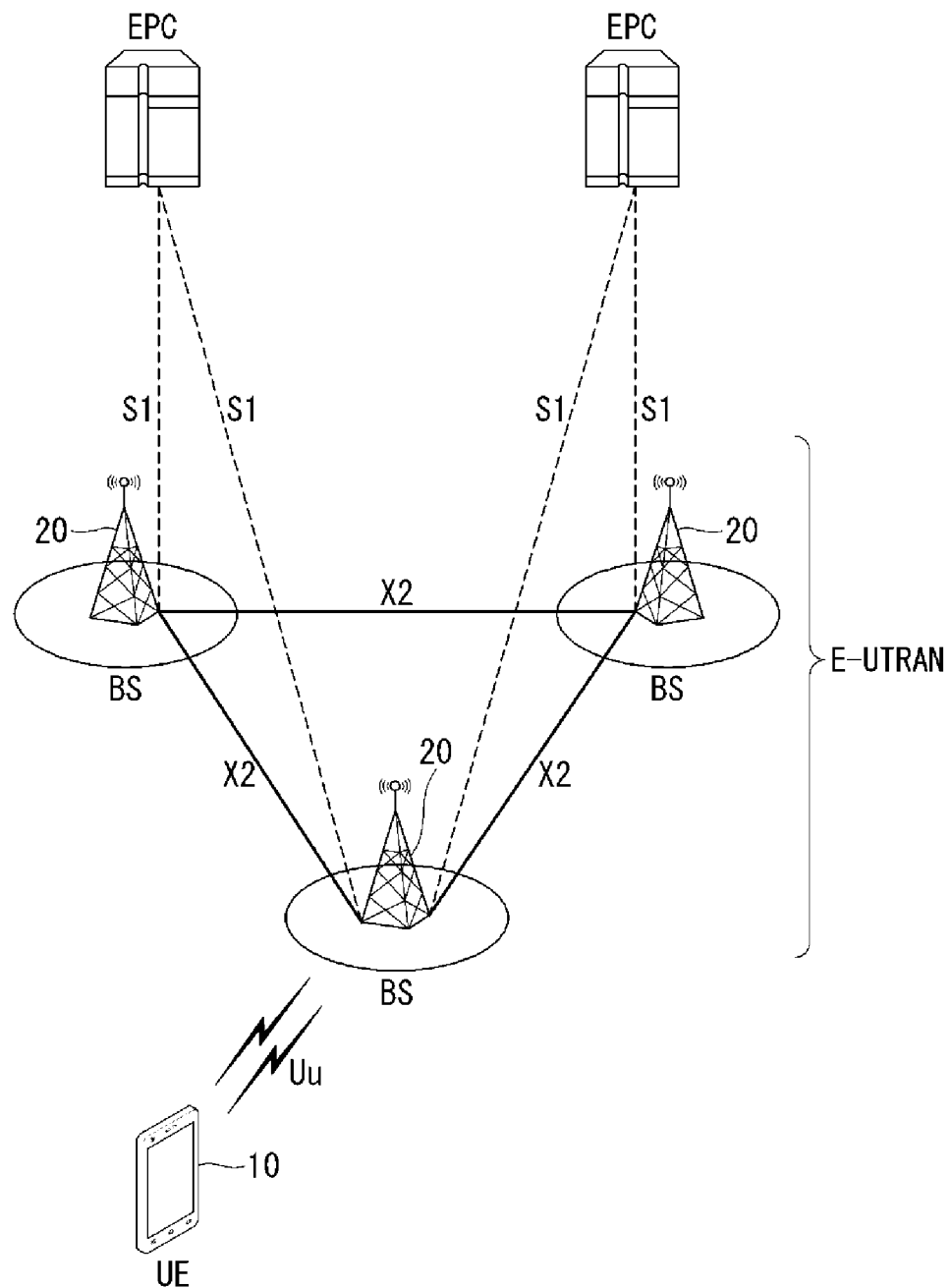

[Figure 2]
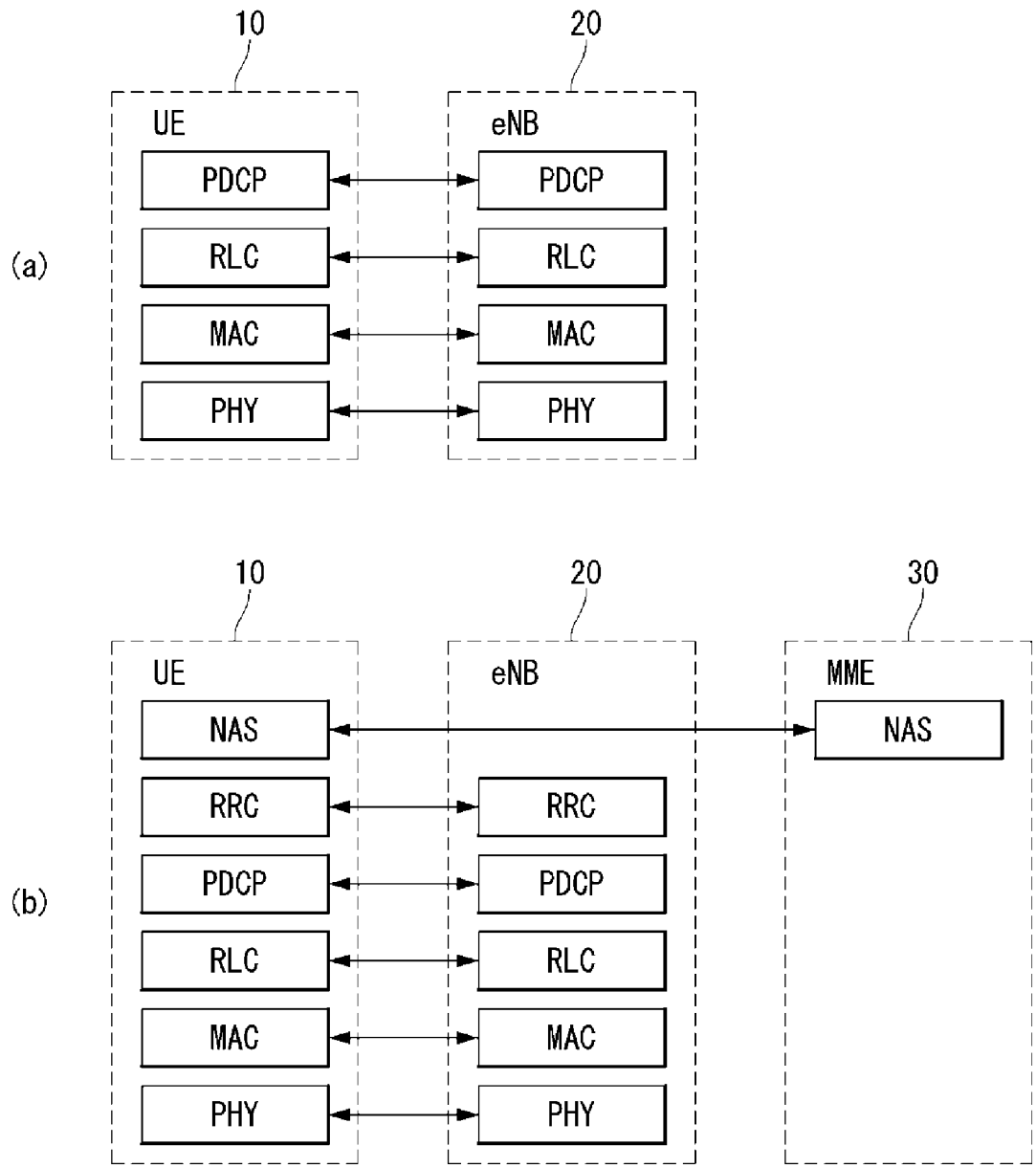

[Figure 3]
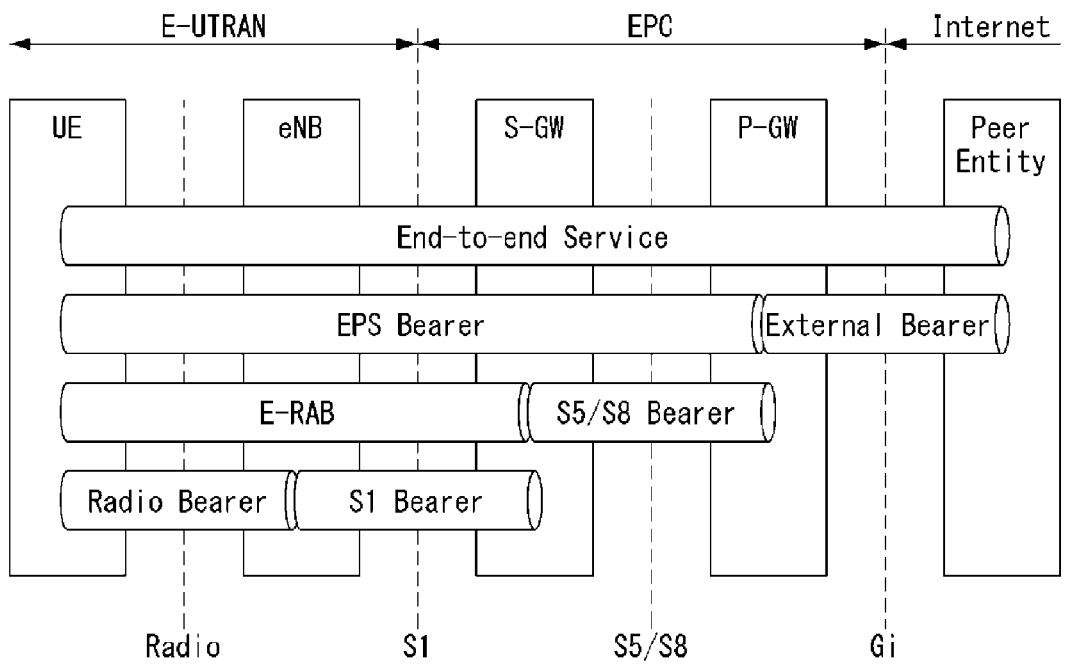
[Figure 4]
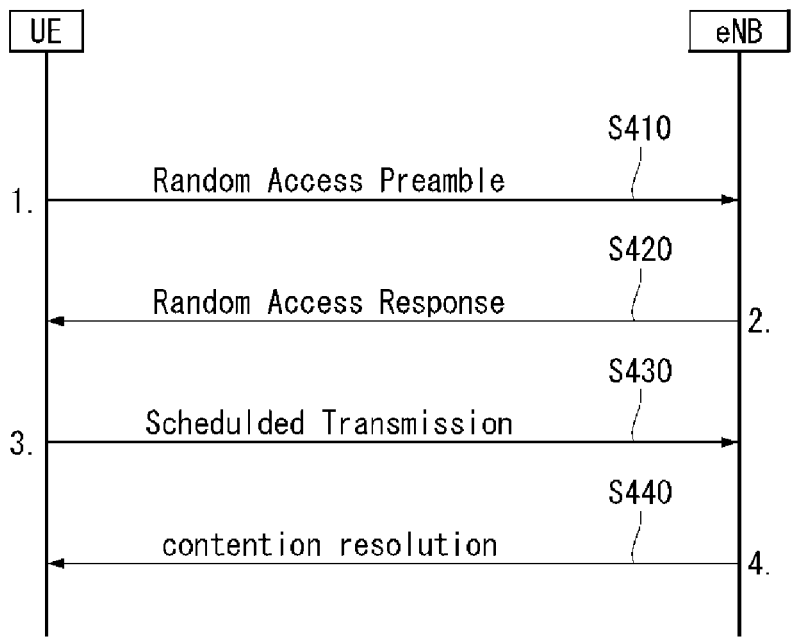

[Figure 5]
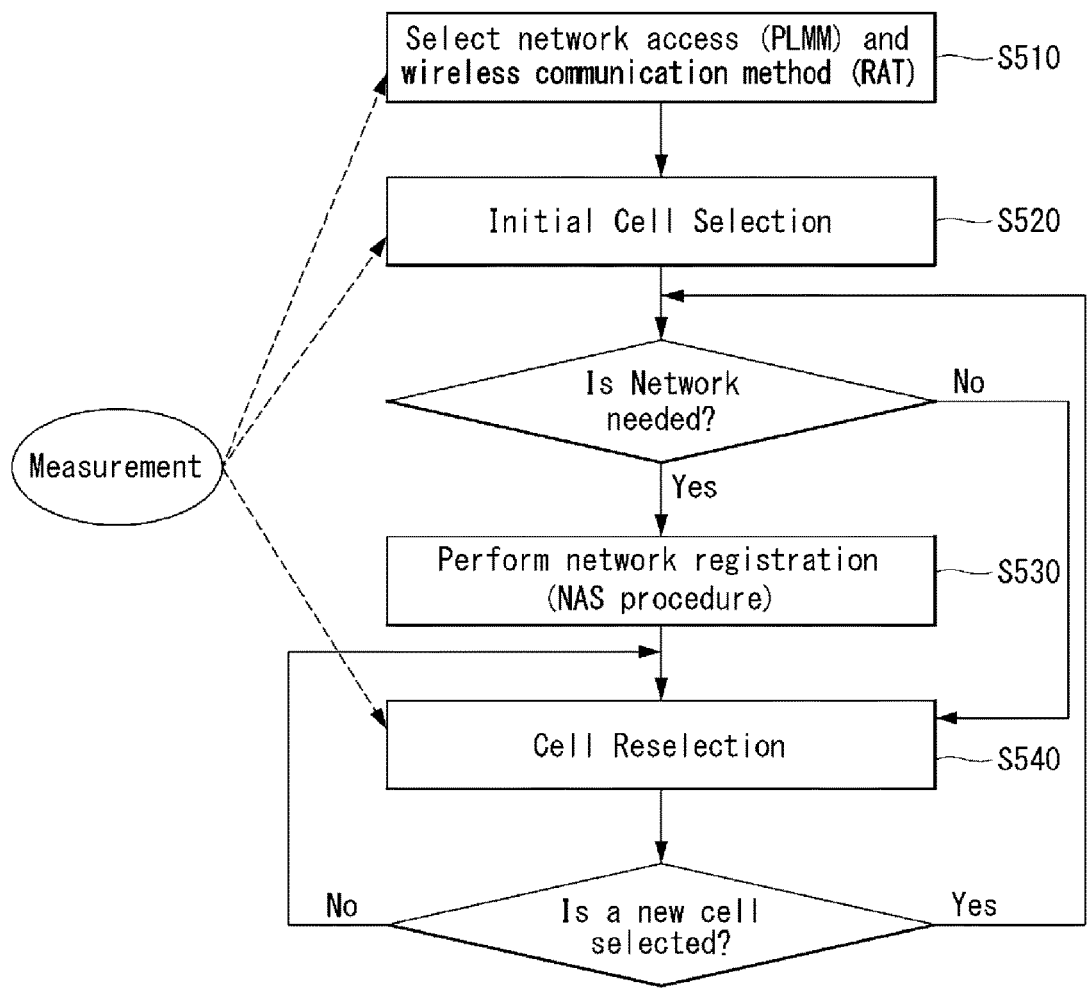

[Figure 6]
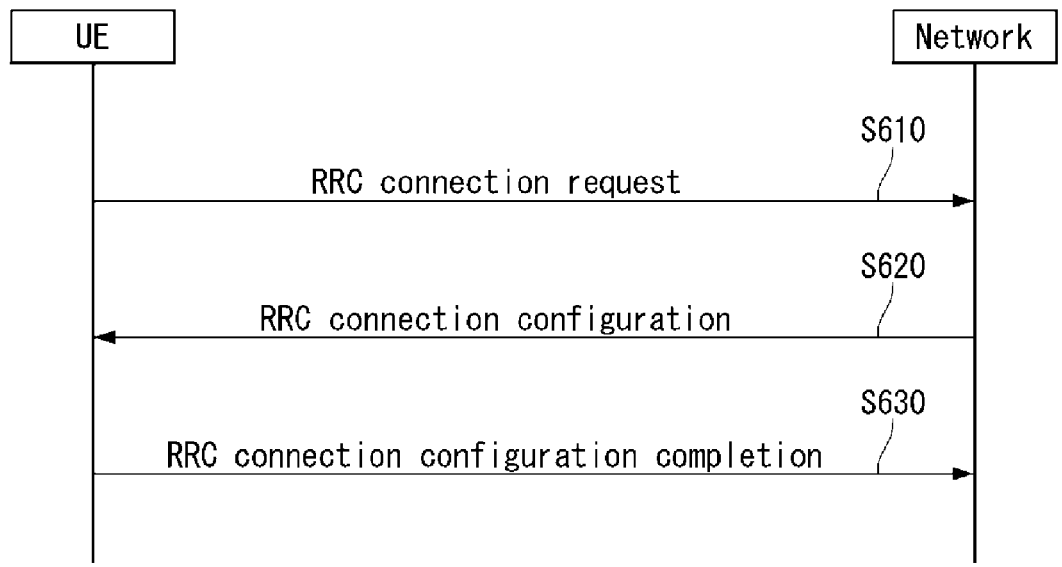
[Figure 7]
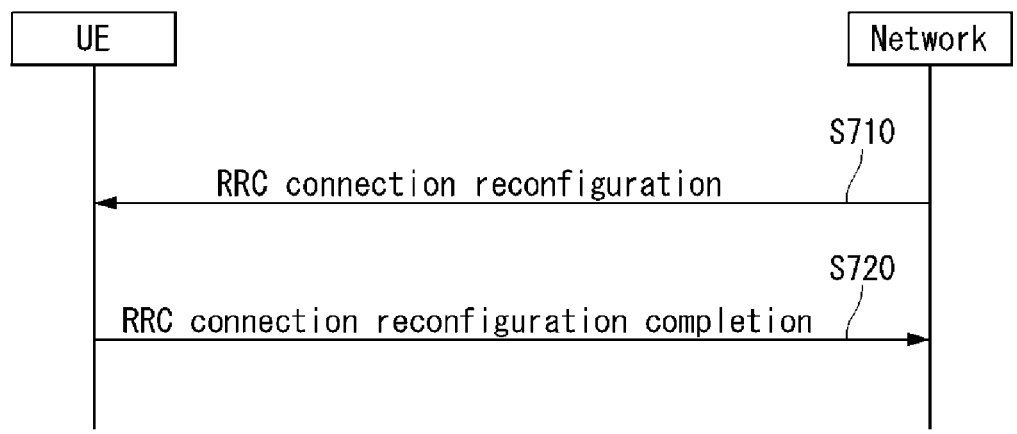

[Figure 8]
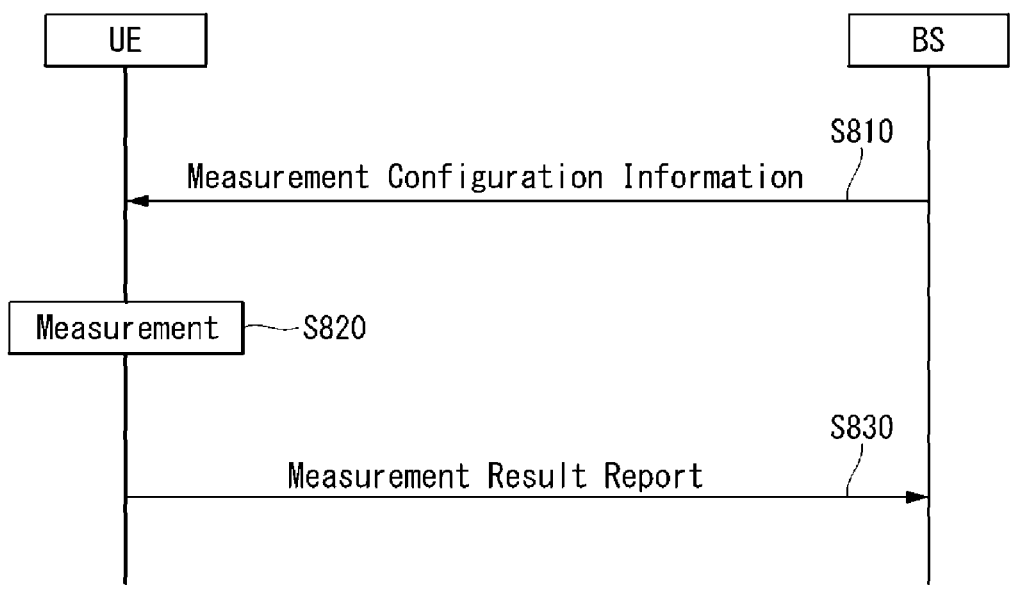

[Figure 9]

[Figure 10]
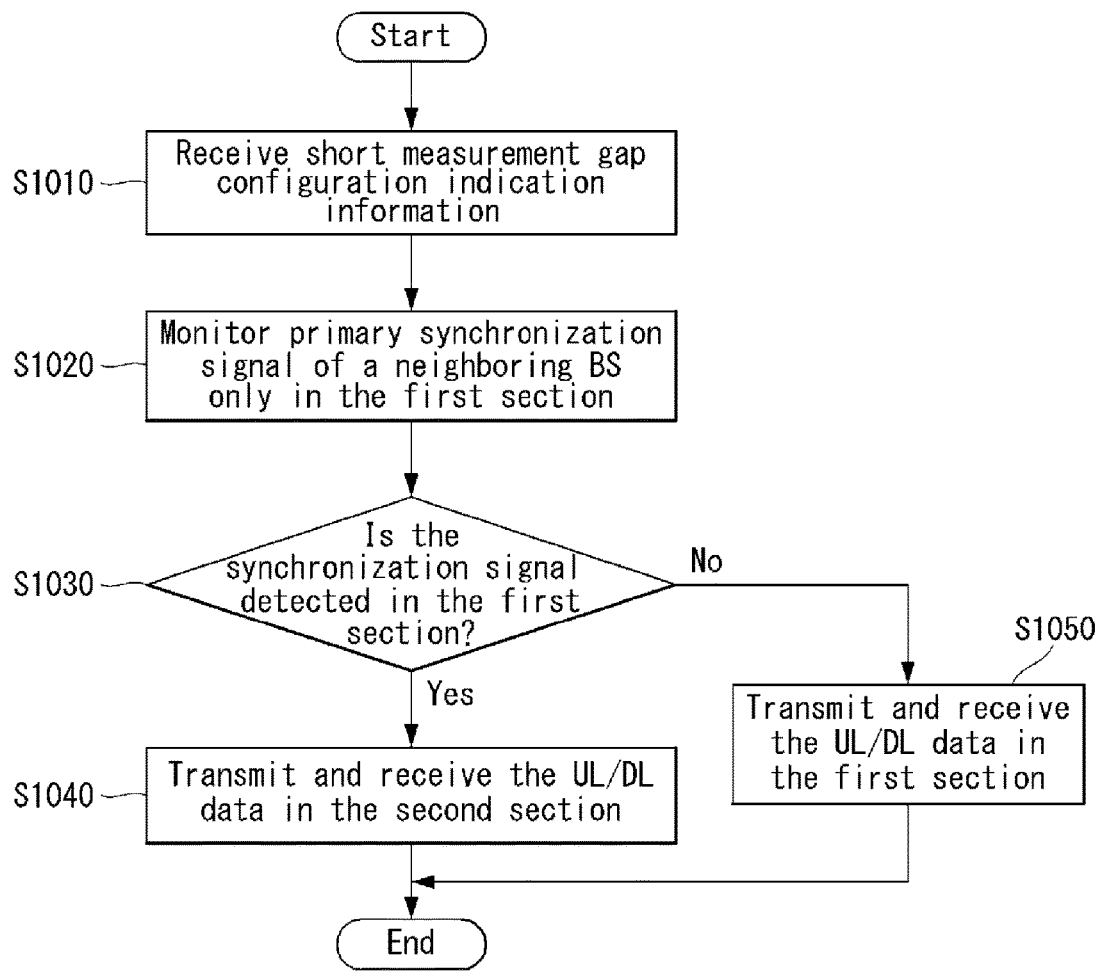

[Figure 11]
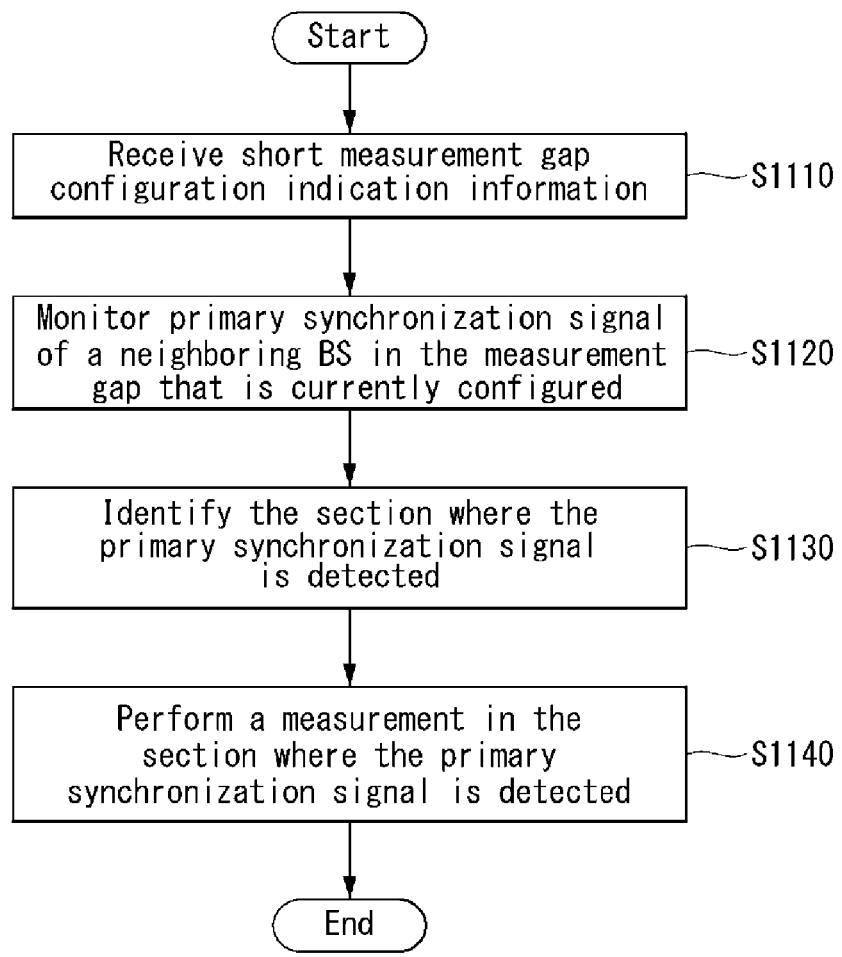
[Figure 12]
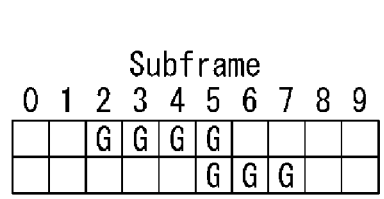
(a)
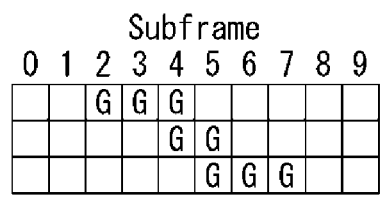
(b)

[Figure 13]

| SFN | Subframe 0 | 1 | 2 | 3 | 4 | 5 | 6 | 7 | 8 | 9 |
|---|---|---|---|---|---|---|---|---|---|---|
| 0 | GAP | | G | G | G | G | | | | |
| 1 | - | | | | | G | G | G | | |
| 2 | - | | G | G | G | G | | | | |
| 3 | - | | | | | G | G | G | | |
| 4 | GAP | | G | G | G | G | | | | |
| 5 | - | | | | | G | G | G | | |
| 6 | - | | G | G | G | G | | | | |
| 7 | - | | | | | G | G | G | | |
| 8 | GAP | | G | G | G | G | | | | |
| 9 | - | | | | | G | G | G | | |
| 10 | - | | G | G | G | G | | | | |
| 11 | - | | | | | G | G | G | | |
| 12 | GAP | | G | G | G | G | | | | |
| 13 | - | | | | | G | G | G | | |
| 14 | - | | G | G | G | G | | | | |
| 15 | - | | | | | G | G | G | | |
| 16 | GAP | | G | G | G | G | | | | |
| 17 | - | | | | | G | G | G | | |
| 18 | - | | G | G | G | G | | | | |
| 19 | - | | | | | G | G | G | | |
| 20 | GAP | | G | G | G | G | | | | |
| 21 | - | | | | | G | G | G | | |
| 22 | - | | G | G | G | G | | | | |
| 23 | - | | | | | G | G | G | | |
| 24 | GAP | | G | G | G | G | | | | |
| 25 | - | | | | | G | G | G | | |
| 26 | - | | G | G | G | G | | | | |
| 27 | - | | | | | G | G | G | | |
| 28 | GAP | | G | G | G | G | | | | |
| 29 | - | | | | | G | G | G | | |
| 30 | - | | G | G | G | G | | | | |
| 31 | - | | | | | G | G | G | | |
| 32 | GAP | | G | G | G | G | | | | |
| 33 | - | | | | | G | G | G | | |
| 34 | - | | G | G | G | G | | | | |
| 35 | - | | | | | G | G | G | | |
| 36 | GAP | | G | G | G | G | | | | |
| 37 | - | | | | | G | G | G | | |
| 38 | - | | G | G | G | G | | | | |
| 39 | - | | | | | G | G | G | | |
| 40 | GAP | | G | G | G | G | | | | |
| 41 | - | | | | | G | G | G | | |
| 42 | - | | G | G | G | G | | | | |
| 43 | - | | | | | G | G | G | | |
| 44 | GAP | | G | G | G | G | | | | |
| 45 | - | | | | | G | G | G | | |
| 46 | - | | G | G | G | G | | | | |
| 47 | - | | | | | G | G | G | | |
| 48 | GAP | | G | G | G | G | | | | |
| 49 | - | | | | | G | G | G | | |
| 50 | - | | G | G | G | G | | | | |
| 51 | - | | | | | G | G | G | | |
| 52 | GAP | | G | G | G | G | | | | |
| 53 | - | | | | | G | G | G | | |
| 54 | - | | G | G | G | G | | | | |
| 55 | - | | | | | G | G | G | | |
| 56 | GAP | | G | G | G | G | | | | |
| 57 | - | | | | | G | G | G | | |
| 58 | - | | G | G | G | G | | | | |
| 59 | - | | | | | G | G | G | | |
| 60 | GAP | | G | G | G | G | | | | |
| 61 | - | | | | | G | G | G | | |
| 62 | - | | G | G | G | G | | | | |
| 63 | - | | | | | G | G | G | | |
| 64 | GAP | | G | G | G | G | | | | |
| 65 | - | | | | | G | G | G | | |
| 66 | - | | G | G | G | G | | | | |
| 67 | - | | | | | G | G | G | | |
| 68 | GAP | | G | G | G | G | | | | |
| 69 | - | | | | | G | G | G | | |
| 70 | - | | G | G | G | G | | | | |
| 71 | - | | | | | G | G | G | | |
| 72 | GAP | | G | G | G | G | | | | |
| 73 | - | | | | | G | G | G | | |
| 74 | - | | G | G | G | G | | | | |
| 75 | - | | | | | G | G | G | | |
| 76 | GAP | | G | G | G | G | | | | |
| 77 | - | | | | | G | G | G | | |
| 78 | - | | G | G | G | G | | | | |
| 79 | - | | | | | G | G | G | | |
| 80 | GAP | | G | G | G | G | | | | |
| 81 | - | | | | | G | G | G | | |
| 82 | - | | G | G | G | G | | | | |
| 83 | - | | | | | G | G | G | | |
| 84 | GAP | | G | G | G | G | | | | |
| 85 | - | | | | | G | G | G | | |
| 86 | - | | G | G | G | G | | | | |
| 87 | - | | | | | G | G | G | | |
| 88 | GAP | | G | G | G | G | | | | |
| 89 | - | | | | | G | G | G | | |
| 90 | - | | G | G | G | G | | | | |
| 91 | - | | | | | G | G | G | | |
| 92 | GAP | | G | G | G | G | | | | |
| 93 | - | | | | | G | G | G | | |
| 94 | - | | G | G | G | G | | | | |
| 95 | - | | | | | G | G | G | | |

[Figure 14]

| SFN | \multicolumn{10}{c}{Subframe} | | | | | | | | | | SFN | \multicolumn{10}{c}{Subframe} | | | | | | | | | |
|---|---|---|---|---|---|---|---|---|---|---|---|---|---|---|---|---|---|---|---|---|---|
| | 0 | 1 | 2 | 3 | 4 | 5 | 6 | 7 | 8 | 9 | | 0 | 1 | 2 | 3 | 4 | 5 | 6 | 7 | 8 | 9 |
| 0 | GAP | | G | G | G | G | | | | | 48 | GAP | | G | G | G | G | | | | |
| 1 | – | | | | | G | G | G | | | 49 | – | | | | | G | G | G | | |
| 2 | – | | | | | | | | | | 50 | – | | | | | | | | | |
| 3 | – | | | | | | | | | | 51 | – | | | | | | | | | |
| 4 | GAP | | G | G | G | G | | | | | 52 | GAP | | G | G | G | G | | | | |
| 5 | – | | | | | G | G | G | | | 53 | – | | | | | G | G | G | | |
| 6 | – | | | | | | | | | | 54 | – | | | | | | | | | |
| 7 | – | | | | | | | | | | 55 | – | | | | | | | | | |
| 8 | GAP | | G | G | G | G | | | | | 56 | GAP | | G | G | G | G | | | | |
| 9 | – | | | | | G | G | G | | | 57 | – | | | | | G | G | G | | |
| 10 | – | | | | | | | | | | 58 | – | | | | | | | | | |
| 11 | – | | | | | | | | | | 59 | – | | | | | | | | | |
| 12 | GAP | | G | G | G | G | | | | | 60 | GAP | | G | G | G | G | | | | |
| 13 | – | | | | | G | G | G | | | 61 | – | | | | | G | G | G | | |
| 14 | – | | | | | | | | | | 62 | – | | | | | | | | | |
| 15 | – | | | | | | | | | | 63 | – | | | | | | | | | |
| 16 | GAP | | G | G | G | G | | | | | 64 | GAP | | G | G | G | G | | | | |
| 17 | – | | | | | G | G | G | | | 65 | – | | | | | G | G | G | | |
| 18 | – | | | | | | | | | | 66 | – | | | | | | | | | |
| 19 | – | | | | | | | | | | 67 | – | | | | | | | | | |
| 20 | GAP | | G | G | G | G | | | | | 68 | GAP | | G | G | G | G | | | | |
| 21 | – | | | | | G | G | G | | | 69 | – | | | | | G | G | G | | |
| 22 | – | | | | | | | | | | 70 | – | | | | | | | | | |
| 23 | – | | | | | | | | | | 71 | – | | | | | | | | | |
| 24 | GAP | | G | G | G | G | | | | | 72 | GAP | | G | G | G | G | | | | |
| 25 | – | | | | | G | G | G | | | 73 | – | | | | | G | G | G | | |
| 26 | – | | | | | | | | | | 74 | – | | | | | | | | | |
| 27 | – | | | | | | | | | | 75 | – | | | | | | | | | |
| 28 | GAP | | G | G | G | G | | | | | 76 | GAP | | G | G | G | G | | | | |
| 29 | – | | | | | G | G | G | | | 77 | – | | | | | G | G | G | | |
| 30 | – | | | | | | | | | | 78 | – | | | | | | | | | |
| 31 | – | | | | | | | | | | 79 | – | | | | | | | | | |
| 32 | GAP | | G | G | G | G | | | | | 80 | GAP | | G | G | G | G | | | | |
| 33 | – | | | | | G | G | G | | | 81 | – | | | | | G | G | G | | |
| 34 | – | | | | | | | | | | 82 | – | | | | | | | | | |
| 35 | – | | | | | | | | | | 83 | – | | | | | | | | | |
| 36 | GAP | | G | G | G | G | | | | | 84 | GAP | | G | G | G | G | | | | |
| 37 | – | | | | | G | G | G | | | 85 | – | | | | | G | G | G | | |
| 38 | – | | | | | | | | | | 86 | – | | | | | | | | | |
| 39 | – | | | | | | | | | | 87 | – | | | | | | | | | |
| 40 | GAP | | G | G | G | G | | | | | 88 | GAP | | G | G | G | G | | | | |
| 41 | – | | | | | G | G | G | | | 89 | – | | | | | G | G | G | | |
| 42 | – | | | | | | | | | | 90 | – | | | | | | | | | |
| 43 | – | | | | | | | | | | 91 | – | | | | | | | | | |
| 44 | GAP | | G | G | G | G | | | | | 92 | GAP | | G | G | G | G | | | | |
| 45 | – | | | | | G | G | G | | | 93 | – | | | | | G | G | G | | |
| 46 | – | | | | | | | | | | 94 | – | | | | | | | | | |
| 47 | – | | | | | | | | | | 95 | – | | | | | | | | | |

[Figure 15]
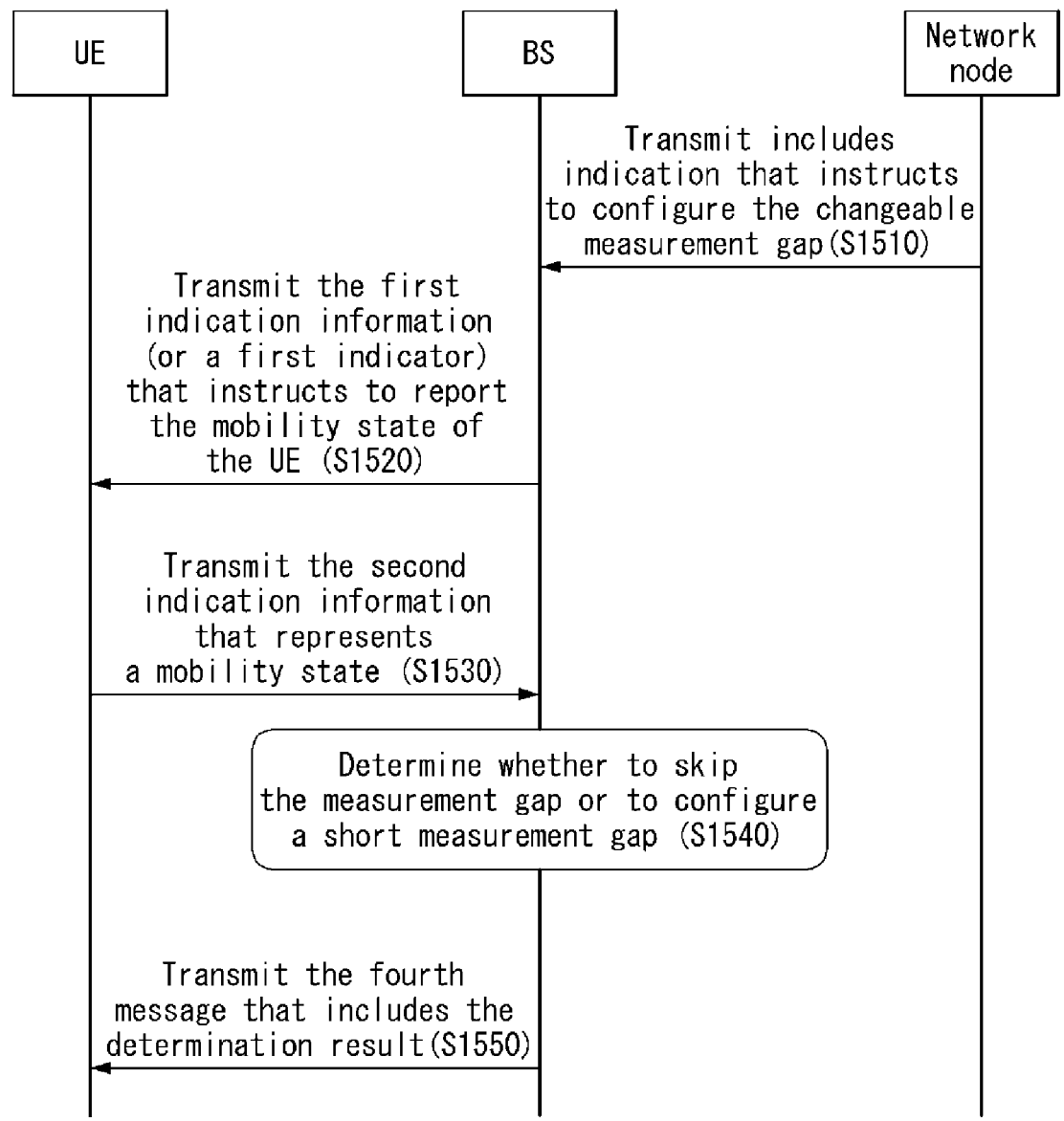

[Figure 16]
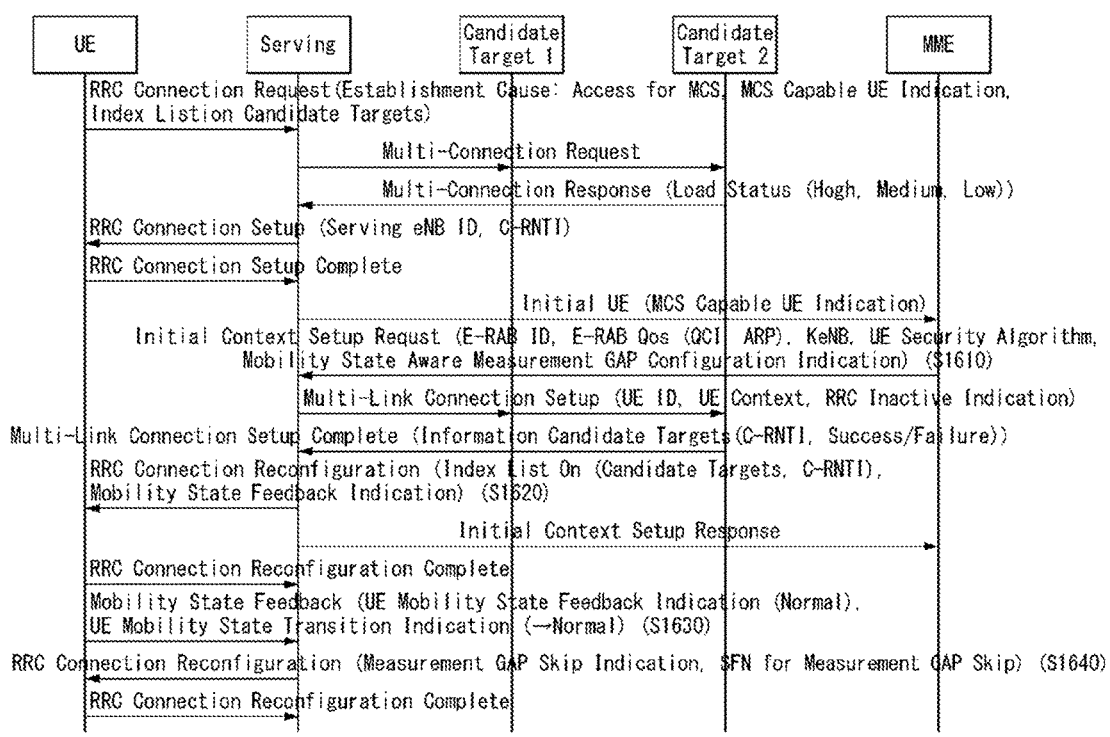

[Figure 17]
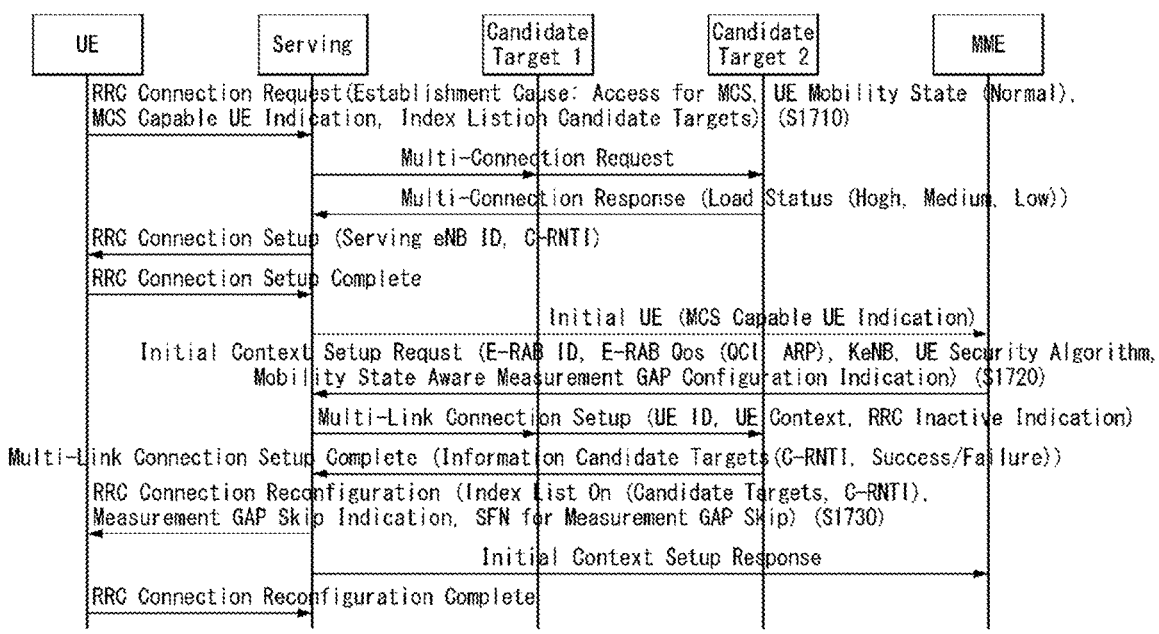

[Figure 18]
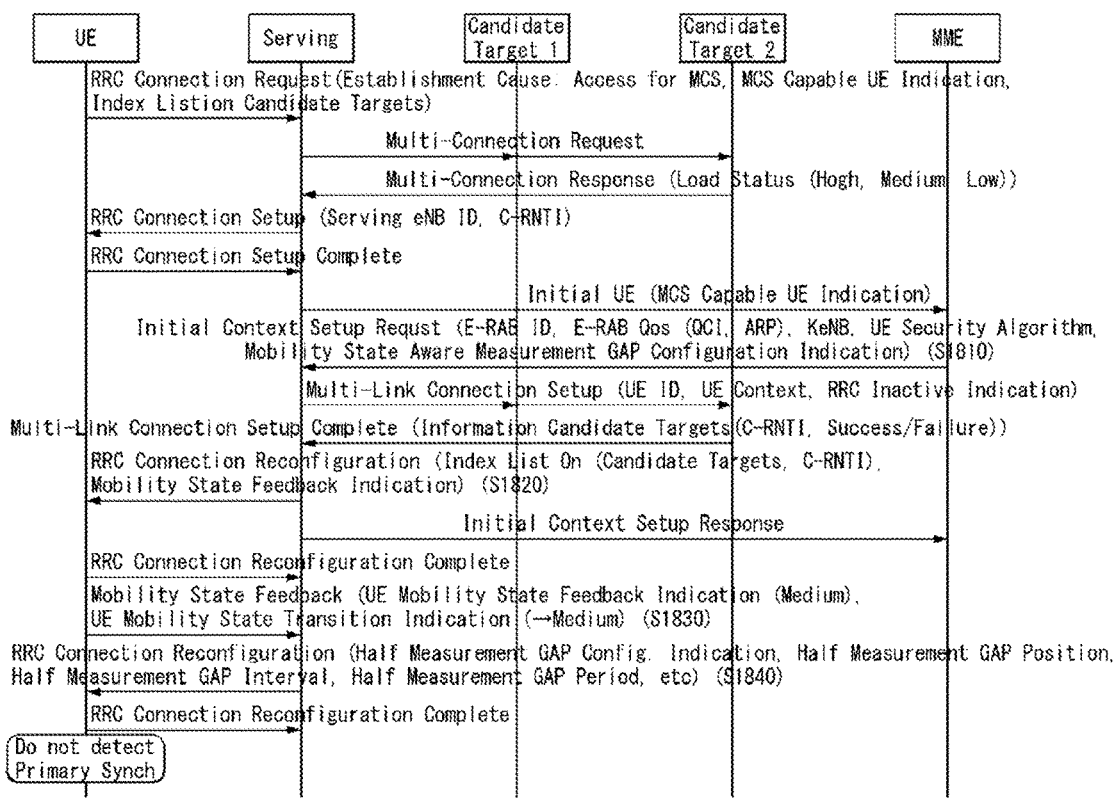

[Figure 19]
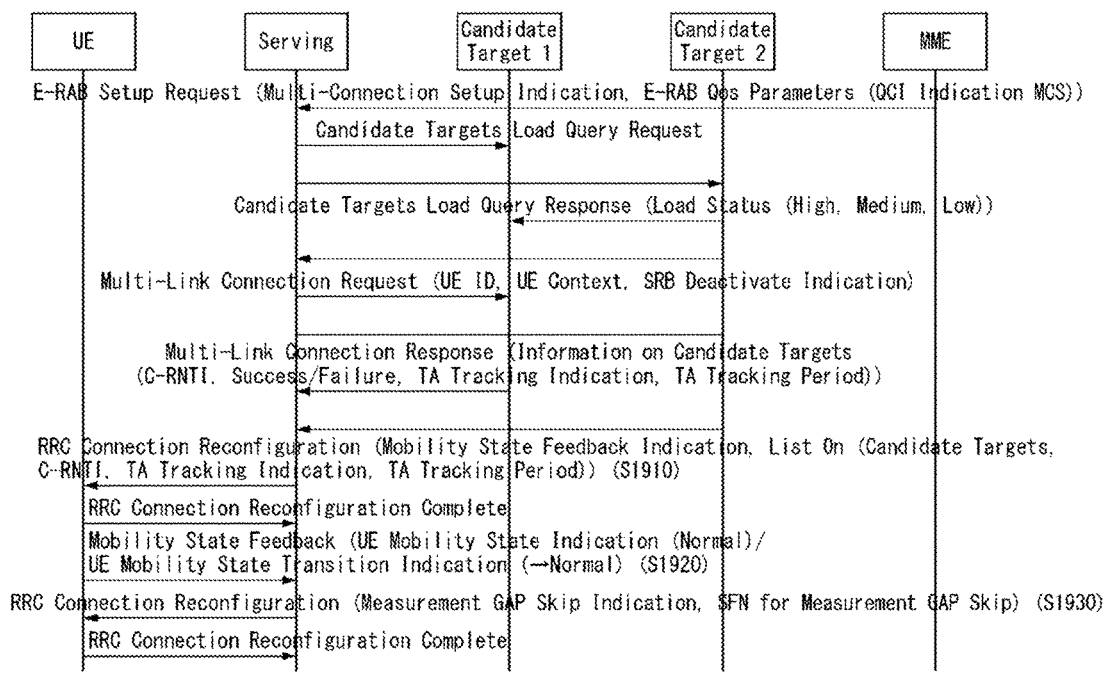

[Figure 20]
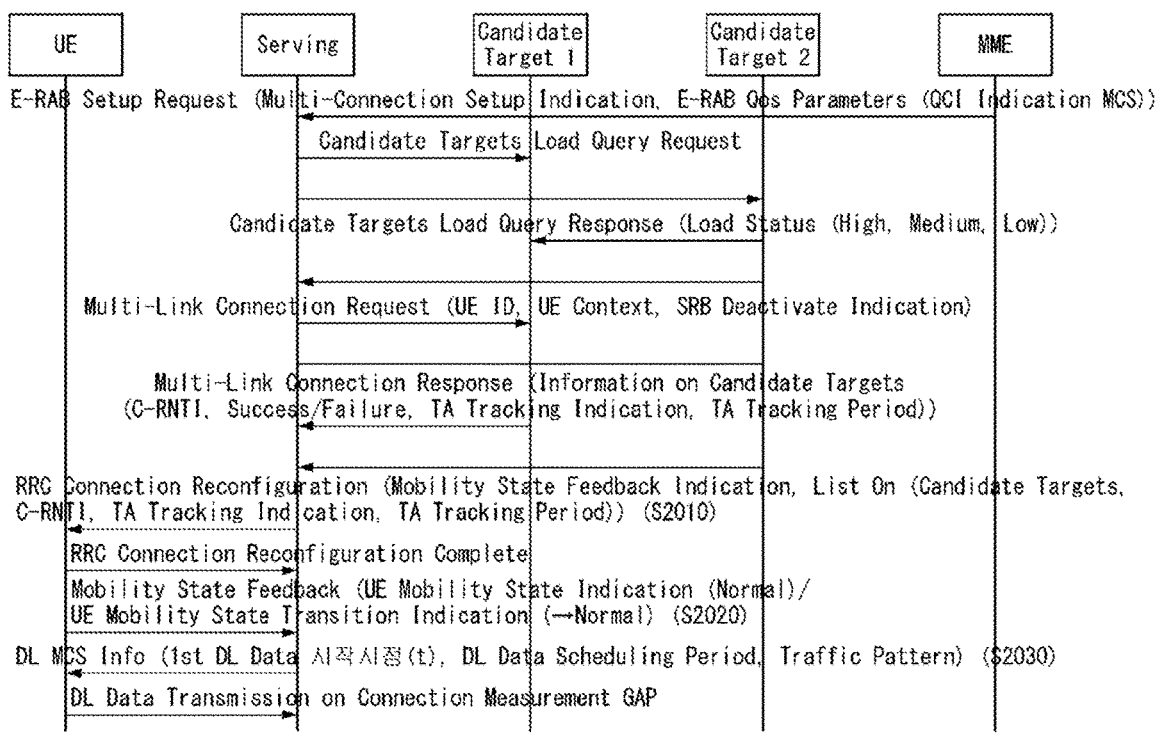

[Figure 21]
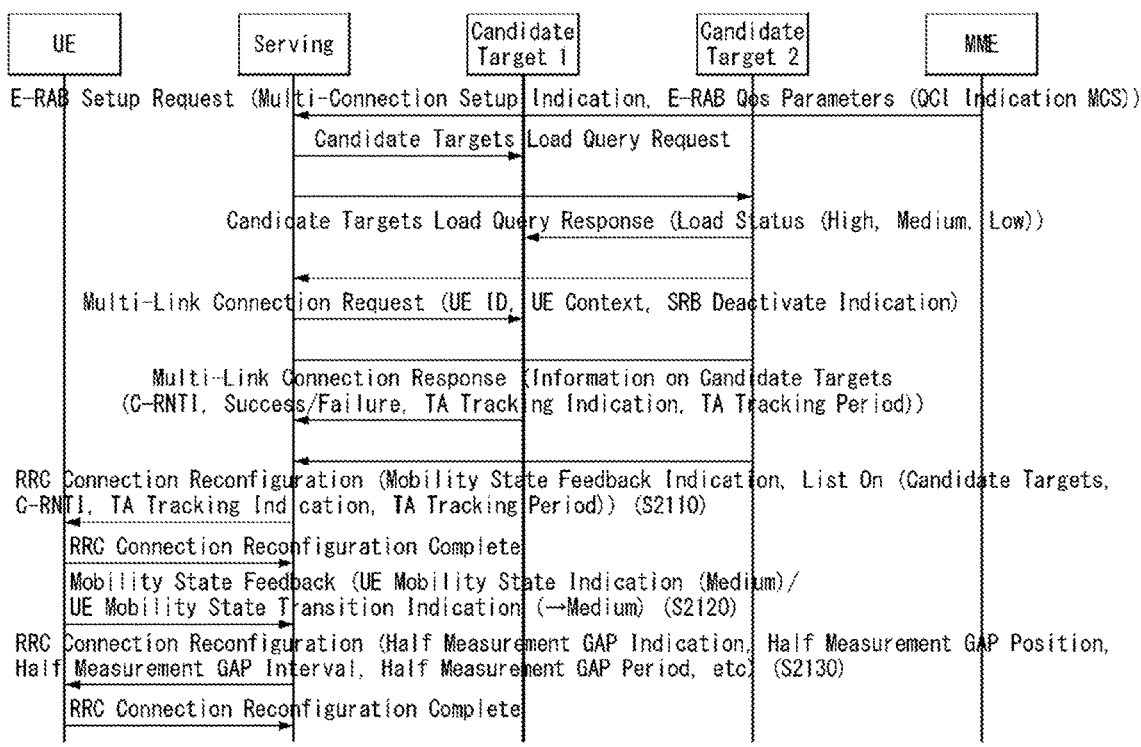

[Figure 22]
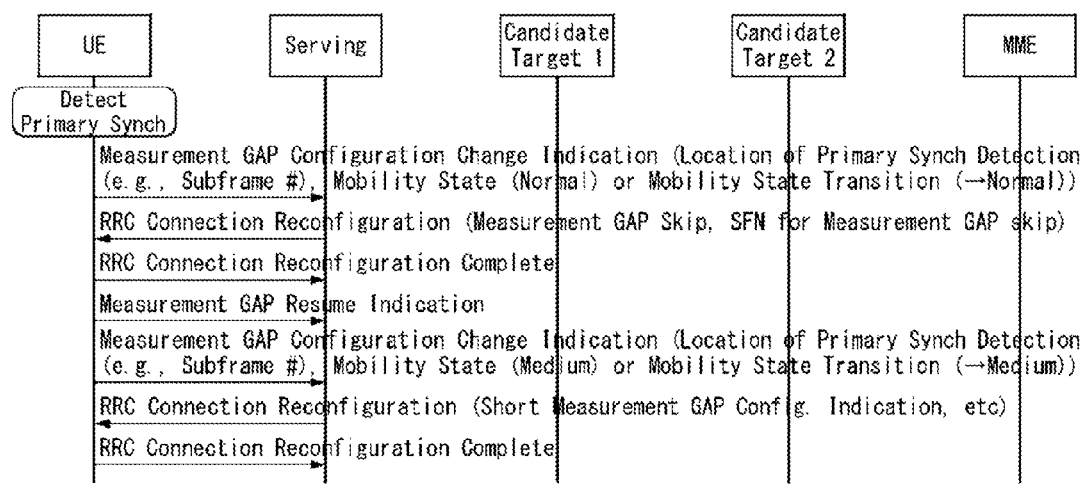

[Figure 23]

| SFN | Subframe 0 | 1 | 2 | 3 | 4 | 5 | 6 | 7 | 8 | 9 |
|---|---|---|---|---|---|---|---|---|---|---|
| 0 | GAP | | | G | G | G | G | G | G | | |
| 1 | - | | | | | | | | | | |
| 2 | - | | | | | | | | | | |
| 3 | - | | | | | | | | | | |
| 4 | GAP | | | G | G | G | G | G | G | | |
| 5 | - | | | | | | | | | | |
| 6 | - | | | | | | | | | | |
| 7 | - | | | | | | | | | | |
| 8 | GAP | | | X | X | X | X | X | X | | |
| 9 | - | | | | | | | | | | |
| 10 | - | | | | | | | | | | |
| 11 | - | | | | | | | | | | |
| 12 | GAP | | | X | X | X | X | X | X | | |
| 13 | - | | | | | | | | | | |
| 14 | - | | | | | | | | | | |
| 15 | - | | | | | | | | | | |
| 16 | GAP | | | G | G | G | G | G | G | | |
| 17 | - | | | | | | | | | | |
| 18 | - | | | | | | | | | | |
| 19 | - | | | | | | | | | | |
| 20 | GAP | | | G | G | G | G | G | G | | |
| 21 | - | | | | | | | | | | |
| 22 | - | | | | | | | | | | |
| 23 | - | | | | | | | | | | |
| 24 | GAP | | | X | X | X | G | G | G | | |
| 25 | - | | | | | | | | | | |
| 26 | - | | | | | | | | | | |
| 27 | - | | | | | | | | | | |
| 28 | GAP | | | X | X | X | G | G | G | | |
| 29 | - | | | | | | | | | | |
| 30 | - | | | | | | | | | | |
| 31 | - | | | | | | | | | | |
| 32 | GAP | | | G | G | G | G | G | G | | |
| 33 | - | | | | | | | | | | |
| 34 | - | | | | | | | | | | |
| 35 | - | | | | | | | | | | |
| 36 | GAP | | | G | G | G | G | G | G | | |
| 37 | - | | | | | | | | | | |
| 38 | - | | | | | | | | | | |
| 39 | - | | | | | | | | | | |
| 40 | GAP | | | G | G | G | G | G | G | | |
| 41 | - | | | | | | | | | | |
| 42 | - | | | | | | | | | | |
| 43 | - | | | | | | | | | | |
| 44 | GAP | | | G | G | G | G | G | G | | |
| 45 | - | | | | | | | | | | |
| 46 | - | | | | | | | | | | |
| 47 | - | | | | | | | | | | |

[Figure 24]
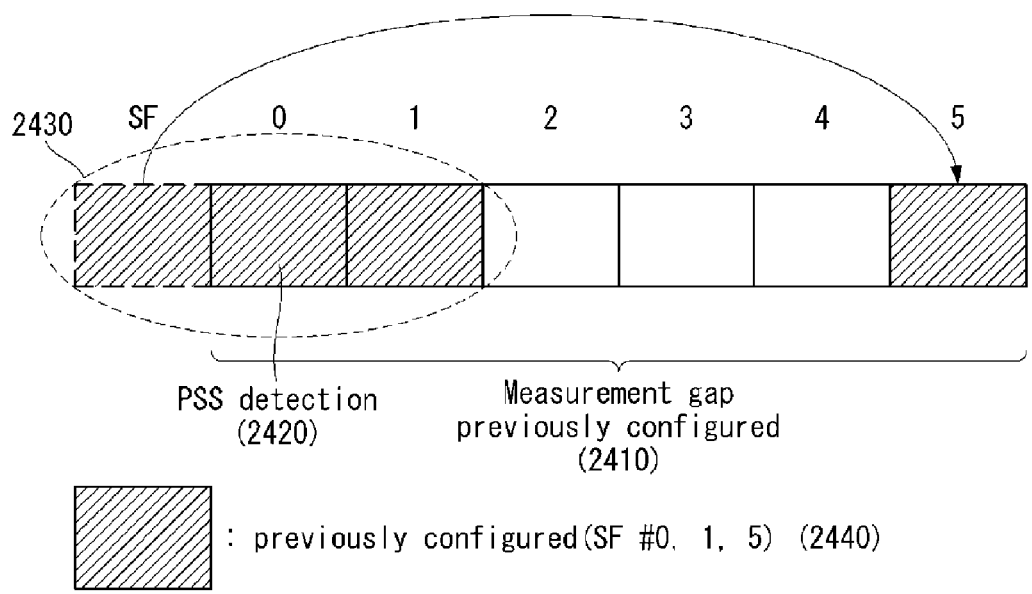
[Figure 25]
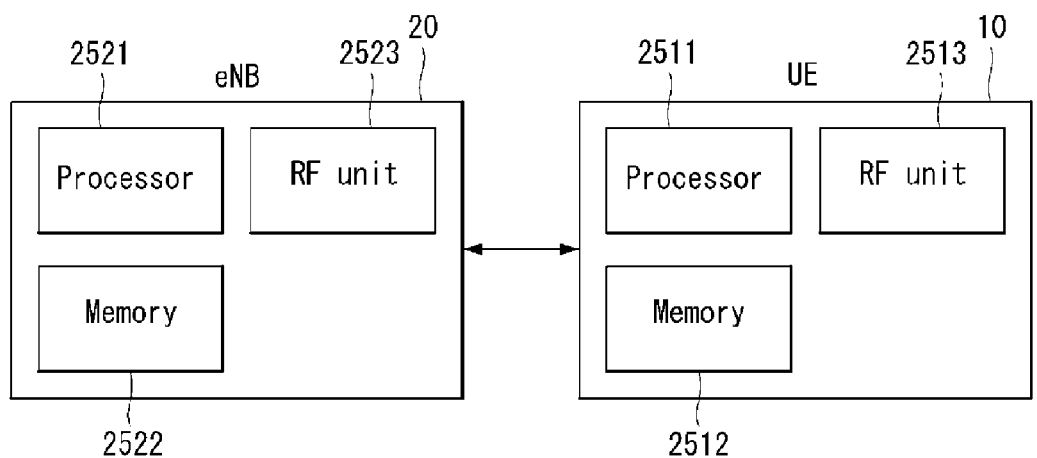

METHOD AND APPARATUS FOR TRANSMITTING AND RECEIVING DATA BASED ON A MEASUREMENT GAP IN A WIRELESS COMMUNICATION SYSTEM

CROSS-REFERENCE TO RELATED APPLICATIONS

Pursuant to 35 U.S.C. § 119(e), this application claims the benefit of U.S. Provisional Patent Application Nos. 62/248,322, filed on Oct. 30, 2015 and 62/297,144, filed on Feb. 19, 2016, the contents of which are all hereby incorporated by reference herein in their entirety.

BACKGROUND OF THE INVENTION

Field of the Invention

The present invention relates to a method for transmitting and receiving data in wireless communication systems, and more particularly, to a method for transmitting and receiving data for a specific service of low latency/high reliability and an apparatus for supporting the same.

Discussion of the Related Art

Mobile communication systems have been developed to provide a voice service while guaranteeing the activity of a user. The areas of the mobile communication systems are extended to a data service in addition to the voice service, and more developed mobile communication systems have been requested since the resources shortage is caused by an explosive increase of traffic and users request services of high speed.

Largely, requirements for the next generation mobile communication system include the acceptance of explosive data traffic, the revolutionary increase of transmission rate per user, the acceptance of the number of connection devices dramatically increased, very low End-to-End Latency and the support of high energy efficiency. In order to fulfill the requirements, various techniques have been researched such as the Dual Connectivity, the massive Multiple Input Multiple Output (MIMO), the In-band Full Duplex, the Non-Orthogonal Multiple Access, the support of Super wideband, the Device Networking, and the like.

Recently, the importance of the 5G mobile communication technology has been increased more and more. And one of the actualized fields is a Reliable Communication.

The Reliable Communication means a new communication service that is realized through the Error Free Transmission or Service Availability for the realization of a Mission Critical Service (MCS).

The necessity of the Reliable Communication has been recognized since it is a part of Machine-Type Communication that satisfies Real-Time requirements for the Traffic Safety, the Traffic Efficiency, the E-Health, the Efficient Industrial Communication, and so on.

In addition, a Reliable Connection should be provided to the Reliable Communication for the applications of delay-sensitive such as the Traffic Safety or the Mission Critical Machine-Type Communications (MTCs) of a special purpose.

Furthermore, the necessity of the Reliable Communication has been also recognized for the purpose of a Medical/Emergency Response, a Remote Control, a Sensing, and the like.

It is anticipated that significant increases are required in the End-to-End Latency, the Ubiquity, the Security, the Availability/Reliability, and the like for the MCSs in comparison with the conventional UMTS/LTE and LTE-A/Wi-Fi.

That is, the commercialized wireless technologies (including 3GPP LTE and LTE-A) proposed up to now fail to guarantee the adequate performance for providing various MCSs in the aspect of the Real-Time requirements and the Reliability requirements.

In addition, as the scenarios that are applicable to the 5G mobile communication environment for the MCSs, the following services may be exemplified.

Control a robot arm remotely in order to realize the Industrial Automation, or transport heavy and large goods through the remote control for Automated Guided Vehicles (AGVs)

Remotely control a drone in order to provide the physical distribution, the remote healthcare service, and other various public services Safely exchange the information required between vehicles in order to provide an autonomous vehicle service or safely deliver the safety signal that notifies a hidden vehicle that is not detected by a vehicle sensor (e.g., camera, radar, etc.) or a forward collision In the case that the radio link (serving link) quality of a serving base station is degraded to an extent of not proper for MCSs although another available alternative base station link is determined, the above-mentioned services should be provided continuously.

Accordingly, in the case that the degradation of the radio link quality of a serving base station is detected and it is determined that the radio link quality of the serving base station is not proper for providing MCSs, a method is required for activating another multilink quickly and for configuring an MCS bearer through the activated multilink.

Owing to the reasons, in order for the Reliable Communication of 5G to be available, a terminal utilizes all radio links around and gives instruction so as to maximize the radio link according to situations, and therefore, the decrease of radio link outage for providing MCS should be considered as an essential element.

However, in the case that the same measurement GAP is configured to the serving base station and alternative base stations and applied to a terminal, as defined in the conventional LTE/LTE-A system, there may occur the problem, which is unable to transmit and receive UL/DL data with the serving base station and the alternative base stations during performing an Inter-Frequency Measurement in the corresponding measurement GAP.

In this case, the requirements of Mission Critical Service that requires the link availability of 99.999% may not be satisfied.

SUMMARY OF THE INVENTION

An object of the present disclosure is to propose a method for preventing a service from being stopped owing to a measurement GAP configuration when providing the multiple connections for the terminal(s) provided with a specific service (e.g., MCS) in the 5G mobile communication system.

In addition, another object of the present invention is to propose a method for preventing a service from being stopped owing to a measurement GAP configuration by configuring a changeable measurement GAP according to the movement speed of the terminal(s).

The technical objects to attain in the present invention are not limited to the above-described technical objects and other technical objects which are not described herein will become apparent to those skilled in the art from the following description.

According to an aspect of the present disclosure, a method for transmitting and receiving data in a wireless communication system performed by a user equipment (UE) includes performing a measurement in a measurement gap; receiving a first indication information that instructs to report a mobility state of the UE from a base station (BS); transmitting a second indication information that represents a mobility state to the BS; receiving control information related to a configuration change of the measurement gap from the BS; and transmitting and receiving data for a specific service with the BS in whole or a specific section of the measurement gap based on the received control information.

In addition, in the present disclosure, the mobility state represents a current mobility state or a changed mobility state of the UE.

In addition, in the present disclosure, the control information is configured based on the second indication information.

In addition, in the present disclosure, the mobility state is one of a normal mobility state, a medium mobility state and a high mobility state.

In addition, in the present disclosure, the control information includes at least one of information that instructs to skip the measurement gap or information that represents a system frame number (SFN) of the skipped measurement gap, when the UE transmits and receives data for a specific service with the BS in the whole section of the measurement gap.

In addition, in the present disclosure, the control information includes at least one of position information that represents a position of a short measurement gap, interval information that represents an interval of the short measurement gap or period information that represents a period of the short measurement gap.

In addition, in the present disclosure, the method for transmitting and receiving data further includes transmitting information representing that it is available to use the specific service to the BS.

In addition, in the present disclosure, the measurement gap includes a first section and a second section, and the specific section of the measurement gap is either of the first section or the second section.

In addition, in the present disclosure, the method for transmitting and receiving data further includes checking whether to detect a primary synchronization signal (PSS) of a neighboring BS in the first section of the measurement gap; and transmitting information notifying to configure the first section as the short measurement gap to the BS, when the primary synchronization signal is detected in the first section as a result of the check, wherein the specific section of the measurement gap is the second section.

In addition, in the present disclosure, the first section is a half of the measurement gap.

In addition, in the present disclosure, the method for transmitting and receiving data further includes checking whether to detect a primary synchronization signal (PSS) of a neighboring BS in the first section of the measurement gap; and transmitting information notifying to configure the second section as the short measurement gap to the BS, when the primary synchronization signal is not detected in the first section as a result of the check, wherein the specific section of the measurement gap is the first section.

In addition, in the present disclosure, a certain section of the first section and the second section overlap.

In addition, according to another aspect of the present disclosure, a method for transmitting and receiving data in a wireless communication system performed by a base station (BS) includes receiving a control message that indicates a measurement gap configuration based on a mobility state from a network entity; transmitting a first indication information that instructs to report a mobility state of a user equipment (UE) to the UE; receiving a second indication information that represents a mobility state of the UE from the UE; changing a configuration of the measurement gap based on the received second indication information; transmitting control information related to the changed measurement gap configuration to the UE; and transmitting and receiving data for a specific service with the UE in whole or a specific section of the measurement gap.

In addition, according to another aspect of the present disclosure, a user equipment (UE) for transmitting and receiving data in a wireless communication system includes a radio frequency (RF) unit for transmitting and receiving a radio signal; and a processor functionally connected to the RF unit, wherein the processor is configured to perform: performing a measurement in a measurement gap; receiving a first indication information that instructs to report a mobility state of the UE from a base station (BS); transmitting a second indication information that represents a mobility state to the BS; receiving control information related to a configuration change of the measurement gap from the BS; and transmitting and receiving data for a specific service with the BS in whole or a specific section of the measurement gap based on the received control information.

In addition, according to another aspect of the present disclosure, a base station (BS) for transmitting and receiving data in a wireless communication system includes a radio frequency (RF) unit for transmitting and receiving a radio signal; and a processor functionally connected to the RF unit, wherein the processor is configured to perform: receiving a control message that indicates a measurement gap configuration based on a mobility state from a network entity; transmitting a first indication information that instructs to report a mobility state of a user equipment (UE) to the UE; receiving a second indication information that represents a mobility state of the UE from the UE; changing a configuration of the measurement gap based on the received second indication information; transmitting control information related to the changed measurement gap configuration to the UE; and transmitting and receiving data for a specific service with the UE in whole or a specific section of the measurement gap.

BRIEF DESCRIPTION OF THE DRAWINGS

FIG. 1 is a diagram illustrating a wireless communication system to which the present invention is applied.

FIG. 2a is a block diagram illustrating an example of a radio protocol architecture for a user plane.

FIG. 2b is a block diagram illustrating an example of a radio protocol architecture for a control plane.

FIG. 3 illustrates a bearer structure in a wireless communication system to which the present invention may be applied.

FIG. 4 is a diagram for describing the operation process of a UE and a BS in the contention-based random access procedure.

FIG. 5 is a flowchart illustrating a UE operation in an RRC idle state to which the present invention may be applied.

FIG. 6 is a flowchart illustrating an RRC connection establishment procedure state to which the present invention may be applied.

FIG. 7 is a flowchart illustrating an RRC connection reconfiguration procedure to which the present invention may be applied.

FIGS. 8 and 9 are diagrams illustrating a method for performing a measurement and a configuration of measurement interval to which the present invention may be applied.

FIG. 10 is a flowchart illustrating an example of a method for configuring a short measurement gap proposed in the present disclosure.

FIG. 11 is a flowchart illustrating another example of a method for configuring a short measurement gap proposed in the present disclosure.

FIG. 12 is a diagram illustrating an example of a short measurement gap configuration proposed in the present disclosure.

FIGS. 13 and 14 illustrate examples of dividing a measurement gap into two sections proposed in the present disclosure.

FIG. 15 is a flowchart illustrating an example of a method for configuring a measurement gap according to the mobility state of a UE proposed in the present disclosure.

FIGS. 16 and 17 are diagrams illustrating examples of a method for skipping the measurement gap that is previously configured proposed in the present disclosure.

FIG. 18 is a diagram illustrating an example of a method for configuring a short measurement gap proposed in the present disclosure.

FIGS. 19 and 20 are flowcharts illustrating other examples of a method for skipping the measurement gap that is previously configured proposed in the present disclosure.

FIG. 21 is a diagram illustrating another example of a method for configuring a short measurement gap proposed in the present disclosure.

FIG. 22 is a flowchart illustrating a method for changing a measurement gap configuration according to a request of UE proposed in the present disclosure.

FIG. 23 is a diagram illustrating an example of a measurement gap configuration change proposed in the present disclosure.

FIG. 24 is a diagram illustrating another example of a method for configuring a short measurement gap proposed in the present disclosure.

FIG. 25 is a block diagram illustrating a wireless device in which the methods proposed in the present disclosure may be implemented.

DETAIL DESCRIPTION OF THE INVENTION

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

In the embodiments of the present disclosure, a base station may be a terminal node of a network, which directly communicates with a terminal In this document, a specific operation described as performed by the base station may be performed by an upper node of the base station. Namely, it is apparent that, in a network having a plurality of network nodes including a base station, various operations performed for communication with a terminal may be performed by the base station, or network nodes other than the base station. The term 'base station (BS)' may be replaced with the term 'fixed station', 'Node B', 'evolved-NodeB (eNB)', 'base transceiver system (BTS)', 'access point (AP)', 'Macro eNB(MeNB)', 'Secondary eNB (SeNB)' etc. And, the 'terminal' may be fixed or mobile, and may be replaced with the term 'user equipment (UE)', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', etc.

Hereinafter, a downlink (DL) refers to communication from the BS to the UE, and an uplink (UL) refers to communication from the UE to the BS. In the downlink, a transmitter may be a part of the BS, and a receiver may be a part of the UE. In the UL, the transmitter may be a part of the UE, and the receiver may be a part of the BS.

Specific terms used in the description below are provided to aid the understanding of the present invention. These specific terms may be replaced with other terms within the scope and spirit of the present invention.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. The CDMA may be implemented as a radio technology such as Universal Terrestrial Radio Access (UTRA) or CDMA2000. The TDMA may be implemented as a radio technology such as Global System for Mobile communications (GSM)/General Packet Radio Service (GPRS)/Enhanced Data Rates for GSM Evolution (EDGE). The OFDMA may be implemented as a radio technology such as IEEE 802.11 (Wi-Fi), IEEE 802.16 (WiMAX), IEEE 802-20, Evolved-UTRA (E-UTRA) etc. The UTRA is a part of Universal Mobile Telecommunication System (UMTS). The $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. The LTE-advance (LTE-A) is an evolution of the 3GPP LTE.

Hereinafter, for better understanding, the terms used herein are briefly defined.

EPS: an abbreviation of an Evolved Packet System. It refers to a core network that supports the Long Term Evolution (LTE) network and to a network evolved from the UMTS.

PDN (Public Data Network): an independent network where a server is placed and provides services.

Access Point Name (APN): the name of an access point that is managed in a network and provided to a UE. That is, an APN is a character string of the PDN. Based on the name of the access point, the corresponding PDN for transmitting and receiving data is determined Tunnel Endpoint Identifier (TEID): The end point ID of a tunnel set between nodes within a network, and it is set for each bearer unit of each UE for each section.

MME: an abbreviation of a Mobility Management Entity. It functions to control each entity within an EPS in order to provide the session and mobility for a UE.

Session: a passage for a data transmission. A unit thereof may be a PDN, a bearer, or an IP flow unit.

The units may be classified into a unit of the entire target network (i.e., an APN or PDN unit) as defined in 3GPP, a unit (i.e., a bearer unit) classified based on QoS within the entire target network, and a destination IP address unit.

PDN connection: a connection from a UE to a PDN, that is, an association (or connection) between a UE represented by an IP address and a PDN represented by an APN. It means a connection between entities (i.e., UE-PDN GW) within a core network so that a session may be formed.

UE context: information about the situation of a UE which is used to manage the UE in a network, that is, the situation information including a UE ID, a mobility (e.g., a current location), and the attributes of a session (e.g., Quality of Service (QoS), priority, etc.).

FIG. 1 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 2(a) is a diagram illustrating a radio protocol architecture for a user plane. FIG. 2(b) is a diagram illustrating a radio protocol architecture for a control plane.

The user plane is a protocol stack for user data transmission. The control plane is a protocol stack for control signal transmission.

Referring to FIGS. 2(a) and 2(b), a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel The MAC layer provides a service to a radio link control (RLC) layer through the logical channel A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel A transmission time interval (TTI) is a unit time of data transmission, and is 1 millisecond (ms) which corresponds to one subframe.

FIG. 3 illustrates a bearer structure in a wireless communication system to which the present invention may be applied.

When a UE is connected to a Packet Data Network (PDN) (which is the peer entity of FIG. 7), a PDN connection is established, which may also be called an EPS session. The PDN provides a service function such as the Internet or IP Multimedia Subsystem (IMS) through an external or internal IP network of a service provider.

An EPS session comprises one or more EPS bearers. The EPS bearer refers to the transmission path of traffic generated between the UE and the PDN GW for the EPS to deliver user traffic. One or more EPS bearers may be set up for each UE.

Each EPS bearer may be classified into E-UTRAN Radio Access Bearer (E-RAB) or S5/S8 bearer, and the E-RAB may be further divided into a Radio Bearer (RB) and S1 bearer. In other words, one EPS bearer corresponds to one RB, one S1 bearer, and one S5/S8 bearer.

The E-RAB delivers packets of the EPS bearer between the UE and the EPC. When an E-RAB is existed, the E-RAB bearer is one-to-one mapped to the EPS bearer. A Data Radio Bearer (DRB) delivers packets of the EPS bearer between the UE and the eNB. When a DRB is existed, it is one-to-one mapped to the EPS bearer/E-RAB. The S1 bearer delivers packets of the EPS bearer between the eNB and the S-GW. The S5/S8 bearer delivers EPS bearer packets between the S-GW and the P-GW.

The UE binds the EPS bearer in the uplink direction with a Service Data Flow (SDF). An SDF is an IP flow or a group of IP flows obtained by classifying (or filtering) user traffic according to an individual service. A plurality of SDFs may be multiplexed to the same EPS bearer by including a plurality of uplink packet filters. The UE stores mapping information between the uplink packet filter and the DRB to bind the SDF and the DRB with each other for uplink transmission.

The P-GW binds the SDF with the EPS bearer in the downlink direction. A plurality of SDFs may be multiplexed to the same EPS bearer by including a plurality of downlink packet filters. The P-GW stores mapping information between the downlink packet filter and the S5/S8 bearer to bind the SDF and the S5/S8 bearer with each other for downlink transmission.

The eNB stores one-to-one mapping information between the DRB and the S1 bearer to bind the DRB and the S1 bearer with each other. The S-GW stores one-to-one mapping information between the S1 bearer and the S5/S8 bearer to bind the S1 bearer and the S5/S8 bearer with each other for uplink/downlink transmission.

The EPS bearer may be one of two types: a default bearer and a dedicated bearer. The UE may have one default bearer and one or more dedicated bearers for each PDN. The minimum basic bearer that the EPS session may have with respect to one PDN is called the default bearer.

The EPS bearer may be classified on the basis of its identity. The EPS bearer identity is allocated by the UE or the MME. The dedicated bearer(s) is combined with the default bearer by a Linked EPS Bearer Identity (LBI).

When the UE establishes an initial connection to the network through an initial attach procedure, an IP address is allocated to the UE to generate a PDN connection, and a default bearer is generated in the EPS interval. Unless the UE terminates the PDN connection, the default bearer is not released but maintained even when there is no traffic between the UE and the corresponding PDN; the default bearer is released when the corresponding PDN connection is terminated. At this time, not all the bearers acting as default bearers with respect to the UE across the whole interval are not activated; the S5 bearer connected directly to the PDN is maintained, and the E-RAB bearer related to radio resources (namely, DRB and S1 bearer) is released. And when new traffic is generated in the corresponding PDN, the E-RAB bearer is reconfigured to deliver traffic.

When the UE attempts to use a service of which the Quality of Service (QoS) (e.g., Video on Demand (VoD) service, etc.) may not be supported by the default bearer while using a service (e.g., the Internet) through the default bearer, a dedicated bearer is created when the UE demands the high QoS service. In the case there is no traffic from the UE, the dedicated bearer is released. The UE or the network may create a plurality of dedicated bearers depending on needs.

Depending on which service the UE uses, the IP flow may have different QoS characteristics. When the EPS session for the UE is established or modified, the network allocates network resources; or determines a control policy about QoS and applies the policy while the EPS session is maintained. The aforementioned operation is called the Policy and Charging Control (PCC). The PCC rule is determined based on the operation policy (e.g., a QoS policy, gate status, charging method, etc.).

FIG. 4 is a diagram for describing the operation process of a UE and a BS in the contention-based random access procedure.

(1) First Message Transmission

First of all, a UE randomly selects a random access preamble from a set of random access preambles indicated by the system information or a handover command, selects a PRACH (physical RACH) resource for carrying the random access preamble, and then transmits the random access preamble via the selected PRACH resource (step, S410).

(2) Second Message Reception

A method for receiving random access response information is similar to the non-contention-based random access procedure described above. That is, after the UE has transmitted the random access preamble in the step S410, the UE attempts a reception of its random access response in a random access response receiving window indicated by a base station through the system information or the handover command, and receives a PDSCH through the corresponding RA-RNTI information (step, S420). Through this, the UE may receive a UL grant, a temporary cell identifier (temporary C-RNTI), a time synchronization correction value (timing advance command: TAC) and the like.

(3) Third Message Transmission

When the UE receives the random access response that is valid, the UE processes the information included in the random access response. In particular, the UE applies the TAC and saves the temporary C-RNTI. Moreover, the UE transmits the data (i.e., the third message) to the BS (step, S430) by using the UL approval. The third message should include the identifier of UE. In the contention-based random access procedure, a BS is unable to determine which UEs perform the random access procedure. In order to resolve the contention later, the BS needs to identify a UE.

As a method of including an identifier of a UE, two kinds of methods have been discussed. According to a first method, if a UE has a valid cell identifier already allocated by a corresponding cell prior to the random access procedure, the UE transmits its cell identifier via UL transmission signal corresponding to the UL grant. On the contrary, if the UE fails to receive the allocation of a valid cell identifier prior to the random access procedure, the UE transmits its unique identifier (e.g., S-TMSI or random ID (random identifier)). In general, the unique identifier is longer than the cell identifier. If the UE transmits data corresponding to the UL grant, the UE initiates a contention resolution timer for resolving contention.

(4) Fourth Message Reception

After the UE has transmitted the data including its identifier via the UL grant included in the random access response, the UE waits for an instruction from the BS for the contention resolution. In particular, the UE may attempt a reception of PDCCH to receive a specific message (step, S440). As a method of receiving the PDCCH, two kinds of methods have been discussed. As mentioned in the foregoing description, if the third message transmitted in response to the UL grant uses a cell identifier as its identifier, the UE attempts a reception of PDCCH using its cell identifier. If the identifier is a unique identifier, the UE may be able to attempt a reception of PDCCH using a temporary C-RNTI included in the random access response. Thereafter, in the former case, if the PDCCH is received via its cell identifier before expiration of the contention resolution timer, the UE determines that the random access procedure is normally performed and then ends the random access procedure. In the latter case, if PDCCH is received via a temporary C-RNTI before expiration of the contention resolution timer, the UE checks data carried on PDSCH indicated by the PDCCH. If the unique identifier of the UE is included in a content of the data, the UE determines that the random access procedure is normally performed and then ends the random access procedure.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

FIG. 5 is a flowchart showing an operation of a UE in RRC_IDLE state to which the present invention can be applied. It is illustrated in FIG. 5 that a procedure of registering a PLMN through a cell selection and performing a cell reselection if needed after the UE is initially turned on.

Referring the FIG. 5, the UE selects a RAT for communicating with a PLMN from which the UE intends to be served (step S510). Information about the PLMN and the RAT may be selected by a user of the UE. The user may use the information stored in a Universal Subscriber Identity Module (USIM).

A UE selects a highest cell among a measured BS and cells having higher quality than a predetermined value (step S520). This procedure is referred as an initial cell reselection, and performed by a UE turned on. The cell selection procedure will be described in the following. After the cell selection, the UE periodically receives system information from the BS. The predetermined value is a value defined in a communication system for ensuring a physical signal quality in data transmission/reception. Therefore, the predetermined value may vary with a RAT to which the each predetermined value is applied.

The UE performs a network registration if needed (step S530). The UE registers self information (i.e. IMSI) for being served by the network (i.e. paging). The UE does not register whenever the UE selects a cell. When the UE's own information about the network is different from information about the network provided from the system information, the UE performs the network registration procedure.

The UE performs cell reselection based on a service environment or the UE's environment provided from the cell (S540). The UE, when the strength or quality value of a signal, which has been measured from the base station from which the UE is serviced, is lower that a value measured from the base station of a neighbor cell, selects one of other cells providing a better signal characteristic than the base station to which the UE is linked. This process is referred to as cell reselection as distinguished from the initial cell selection of the No. 2 process. At this time, a temporal restricting condition is assigned to prevent cells from being frequently reselected as the signal characteristics vary. The cell reselection procedure is to be described below in detail.

FIG. 6 is a flowchart showing an RRC connection establishment procedure to which the present invention can be applied.

A UE sends to a network an RRC connection request message for requesting an RRC connection (step S610). The network sends an RRC connection setup message in response to the RRC connection request (step S620). After receiving the RRC connection setup message, the UE enters an RRC connection mode.

The UE sends to the network an RRC connection setup complete message used to confirm successful completion of the RRC connection establishment (step S630).

FIG. 7 is a flowchart showing an RRC connection reconfiguration procedure. An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (step S710). In response to the RRC connection reconfiguration, the UE sends to the network an RRC connection reconfiguration complete message used to confirm successful completion of the RRC connection reconfiguration (step S720).

Next, a procedure for selecting a cell by the UE will be described in detail.

If the UE is turned on or is camped on a cell, the UE may perform procedures for selecting/reselecting a cell having suitable quality in order to receive a service.

The UE in an RRC idle state needs to be ready to receive the service through the cell by selecting the cell having suitable quality all the time. For example, the UE that has been just turned on must select the cell having suitable quality so as to be registered into a network. If the UE that has stayed in an RRC connected state enters into the RRC idle state, the UE must select a cell on which the UE itself is camped. As such, a process of selecting a cell satisfying a certain condition by the UE in order to stay in a service waiting state such as the RRC idle state is called a cell selection. The cell selection is performed in a state that the UE does not currently determine a cell on which the UE itself is camped in the RRC idle state, and thus it is very important to select the cell as quickly as possible. Therefore, if a cell provides radio signal quality greater than or equal to a predetermined level, the cell may be selected in the cell selection process of the UE even though the cell is not a cell providing best radio signal quality.

Hereinafter, by referring to the 3GPP TS 36.304 V8.5.0 (2009-03) 'User Equipment (UE) procedures in idle mode (Release 8)', a method and procedure for selecting a cell by a UE in 3GPP LTE will be described in detail.

If power is initially turned on, the UE searches for available PLMNs and selects a suitable PLMN to receive a service. Subsequently, the UE selects a cell having a signal quality and property capable of receiving a suitable service among the cells provided by the selected PLMN.

The cell selection process can be classified into two processes.

One process is an initial cell selection process, and in this process, the UE does not have previous information on radio channels. Therefore, the UE searches for all radio channels to find a suitable cell. In each channel, the UE searches for the strongest cell. Subsequently, if a suitable cell satisfying cell selection criteria is found, the UE selects the cell.

After the UE selects a certain cell through a cell selection process, the signal strength and quality between the UE and the BS may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called a cell reselection. A basic purpose of the cell reselection process is generally to select a cell providing best quality to the UE from the perspective of the radio signal quality.

In addition to the perspective of the radio signal quality, the network may notify the UE of a priority determined for each frequency. The UE that has received the priority may consider this priority more preferentially than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

The principles of the cell reselection process are as follows.

First, the UE measures quality of a serving cell and a neighboring cell for a cell reselection.

Second, the cell reselection is performed based on cell reselection criteria. The cell reselection criteria have following characteristics with regard to the measurement of serving cells and neighboring cells.

The intra-frequency cell reselection is basically based on ranking. The ranking is an operation for defining a criterion value for evaluation of the cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having a top priority. The network may provide the same frequency priority to be commonly applied to UEs in a cell by using broadcast signaling or may provide a frequency-specific priority to each UE by using dedicated signaling for each UE.

For the inter-frequency cell reselection, the network may provide parameters (e.g., frequency-specific offsets) for use in cell reselection to the UE for each frequency.

For the intra-frequency cell reselection or the inter-frequency cell reselection, the network may provide a neighboring cell list (NCL) for use in the cell reselection to the UE. The NCL includes cell-specific parameters (e.g. cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

Hereinafter, RLM (Radio Link Monitoring) is described.

A UE monitors downlink quality based on a cell-specific reference signal in order to detect downlink radio link quality of a PCell.

The UE estimates downlink radio link quality for the purpose of monitoring the downlink radio link quality of the PCell and compares the estimated quality with thresholds Qout and Qin. The threshold Qout is defined as a level where stable reception through a downlink radio link is impossible, and this corresponds to a 10% block error rate of hypothetical PDCCH transmission considering PDFICH errors. The threshold Qin is defined as a downlink radio link quality level at which more stable reception may be made than at the threshold Qout, and this corresponds to a 2% block error rate of hypothetical PDCCH transmission considering PCFICH errors.

The following description is related to measurement and measurement report.

It is necessary for a mobile communication system to support mobility of a UE. Therefore, the UE persistently measures quality of a serving cell providing a current service and quality of a neighboring cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, mobility is generally supported between different cells existing in the same frequency band. Therefore, in order to properly guarantee the UE mobility, the UE has to properly measure cell information and quality of neighboring cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

A mobile communication service provider may perform a network operation by using a plurality of frequency bands. If a service of a communication system is provided by using the plurality of frequency bands, optimal mobility can be guaranteed to the UE when the UE is able to properly measure cell information and quality of neighboring cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Figure 9:
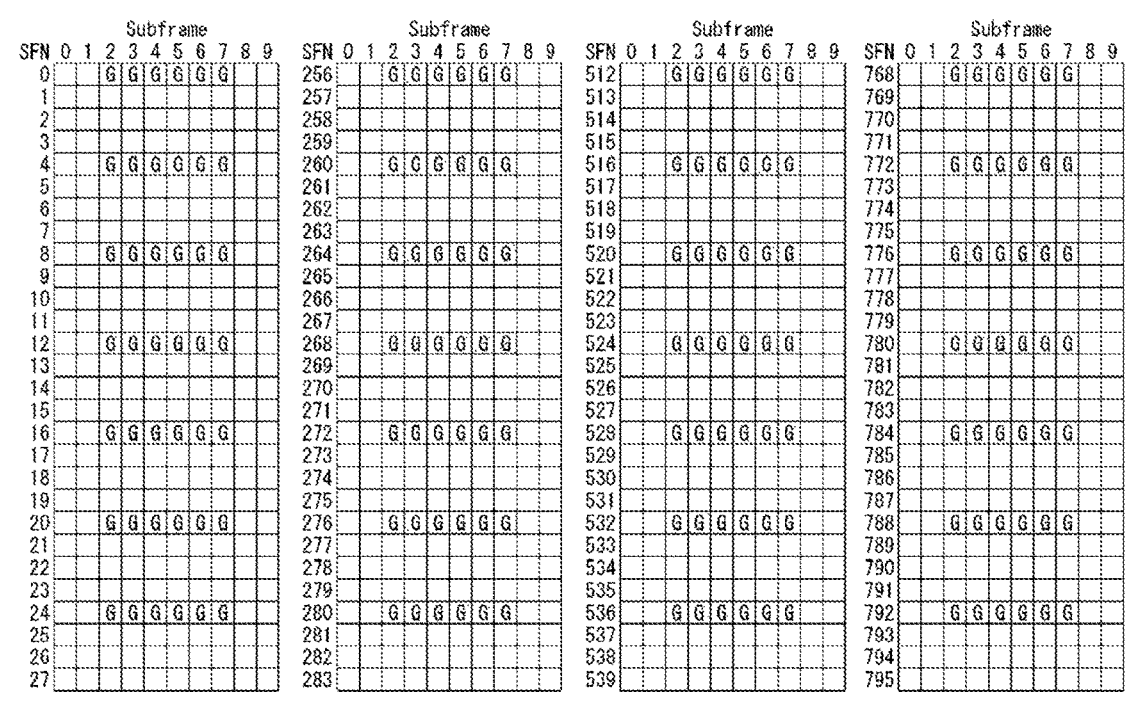

FIGS. 8 and 9 are diagrams illustrating a method for performing a measurement and a configuration of measurement interval to which the present invention may be applied.

A UE receives measurement configuration information from a BS (step, S810). A message including the measurement configuration information is referred to as a measurement configuration message. The UE performs measurement based on the measurement configuration information (step, S820). If a measurement result satisfies a reporting condition included in the measurement configuration information, the UE reports the measurement result to the BS (step S830). A message including the measurement result is referred to as a measurement report message.

The measurement configuration information may include the following information.

(1) Measurement object information: The information is on which the UE performs the measurements. The measurement object includes at least one of an intra-frequency measurement object which is an object of intra-cell measurement, an inter-frequency measurement object which is an object of inter-cell measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration information: The information is on a reporting condition and a reporting type about the timing of reporting the transmitted measurement result. The reporting configuration information may include a list of reporting configurations. Each of the reporting configurations may include a reporting criterion and a reporting format. The reporting criterion is used to trigger the UE to send a measurement report and may either be periodical or a single event description. The reporting format is information on which type of the measurement result is configured.

(3) Measurement identity information: This information is on a measurement identity that enables the UE to determine to report for which measurement object and on which type and when to report it by linking the measurement object with the reporting configuration. The measurement identity information may be included in the measurement report message to indicate a specific measurement object for which the measurement result is obtained and a specific reporting condition according to which the measurement report is triggered.

(4) Quantity configuration information: This information is on a parameter for configuring filtering of a measurement unit, a report unit and/or a measurement result value.

(5) Measurement gap information: This information is on a measurement gap, which is a period that the UE may use to perform measurements only without considering a data transmission with a serving cell. That is, no data is transmitted and received during the measurement gap.

Table 1 below represents an example of a pattern of the measurement gap.

TABLE 1

| Gap pattern ID | Measurement gap length (MGL, ms) | Measurement gap repetition period (MGL, ms) | Minimum use time for measuring inter frequency and an inter-RAT measurement during 480 ms | Object of measurement |
|---|---|---|---|---|
| 0 | 6 | 40 | 60 | Inter-Frequency E-UTRAN DFF and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |

FIG. 9 illustrates an example of the measurement gap is configured in the case that a gap pattern is set to 40 ms and a gap offset is set to 2.

A UE has a measurement object list, a measurement reporting configuration list and a measurement identity list in order to perform the measurement procedure.

In 3GPP LTE, the BS can assign only one measurement object to the UE with respect to one frequency. Events for triggering measurement reporting shown in the table below are defined in the section 5.5.4 of 3GPP TS 36.331 V8.5.0 (2009-03) "Evolved Universal Terrestrial Radio Access (E-UTRA) Radio Resource Control (RRC); Protocol specification (Release 8)".

TABLE 2

| Event | Reporting Condition |
|---|---|
| Event A1 | Serving becomes better than threshold |
| Event A2 | Serving becomes worse than threshold |
| Event A3 | Neighbour becomes offset better than Serving |
| Event A4 | Neighbour becomes better than threshold |
| Event A5 | Serving becomes worse than threshold1 and neighbor becomes better than threshold2 |
| Event B1 | Inter RAT neighbour becomes better than threshold |
| Event B2 | Serving becomes worse than threshold1 and inter RAT neighbor becomes better than threshold2 |

If the measurement result of the UE satisfies the determined event, the UE transmits a measurement report message to the BS.

First Embodiment: a Method for Configuring a Short Measurement Gap

Hereinafter, a method for configuring a short measurement gap proposed in the present disclosure will be described.

The first embodiment, that is, the method for configuring a short measurement gap relates to a method for satisfying the delay requirements for the specific service by configuring the measurement gap shortly, which is applied with being configured for each UE and by transmitting/receiving the data for the specific service in the remaining section after configuring the multiple connections between a UE and a BS(s) in order to provide the specific service (e.g., MCS) of brand new 5G with high service availability.

The specific service used in the present disclosure represents a service that should satisfy the low latency requirement of 5G described above, and the Mission Critical Service (MCS) may be an example of the specific service.

Hereinafter, for the convenience of description, the specific service is referred to or expressed as 'MCS' except there is a special comment.

Particularly, the method for configuring a short measurement gap proposed in the present disclosure relates to a method for transmitting MCS data in 'D (ms)' by configuring the measurement gap, which is already configured shortly, to be short (2/N), when the measurement gap set to a UE is 'N' in order to support the MCS and the latency requirement for the corresponding MCS is 'D' (the service should be arrived within D).

The method for configuring a short measurement gap of the first embodiment includes two methods (method 1 and method 2) as an example.

Firstly, the first method (method 1) relates to a method for checking whether the synchronization signal of a neighboring BS is detected only in a specific section of the measurement gap that is currently configured, and for shortly configuring the measurement gap that is configured by the specific section or the remaining section according to the detection result.

Herein, the remaining section is the section except the specific section from the currently configured measurement gap.

Next, the second method (method 2) relates to a method for checking whether the synchronization signal of a neighboring BS is detected in the entire sections of the measurement gap that is currently configured, and for shortly configuring the measurement gap to be the section where the synchronization signal is detected.

Herein, it is assumed that the transmission period of the Primary Synchronization Signal (PSS) of the neighboring BS that is detected by a specific frequency in the measurement gap currently configured is N subframes (e.g., 6 subframes).

Hereinafter, method 1 and method 2 of the first embodiment will be described in more detail.

Both of method 1 and method 2 apply the configuration of measurement gap to N/M (e.g., M=2) subframe(s) in order for the measurement gap that is currently configured to satisfy the latency requirement of the MCS.

Method 1

FIG. 10 is a flowchart illustrating an example of a method for configuring a short measurement gap proposed in the present disclosure.

The measurement gap that is currently configured (to a UE) may include two sections, that is, a first section and a second section.

Otherwise, the measurement gap may be classified (or partitioned) into two sections.

Firstly, method 1 relates to a method for configuring the measurement gap shortly, which is currently configured in the section where a primary synchronization signal is detected by checking whether to detect the primary synchronization signal of a neighboring BS only in the first section of the measurement gap.

Particularly, a UE receives the indication information (e.g., half Measurement GAP Indication) indicating that the current measurement gap is able to be configured to a short (e.g., half) measurement gap from a (serving) BS (step, S1010).

Later, the UE monitors the primary synchronization signal (PSS) of the neighboring BS(s) only in the first section of the measurement gap (step, S1020).

Then, the UE checks whether to detect the primary synchronization signal in the first section (step, S1030).

When the UE detects the primary synchronization signal in the first section, the UE does not perform the measurement in the remaining section, that is, the second section, and transmits and receives the UL/DL data to/from the serving BS (step, S1040).

That is, the UE shortly configures (or decreases) the measurement gap as the first section.

When the UE fails to detect the primary synchronization signal in the first section, the UE notifies that the UE fails to detect the primary synchronization signal in the first section to the BS, and uses the first section for transmitting and receiving the UL/DL data with the serving BS (step, S1050).

And, the UE configures the second section as the short measurement gap, and performs a measurement.

Herein, the UE may notify the information related to the short measurement gap (newly or shortly configured) to the serving BS by using measurement gap switch indication information.

The measurement gap switch indication information may include the information related to the cause of the measurement gap configuration (e.g., failing to detect the primary synchronization signal).

In summary, method 1 relates to a method for performing a measurement by newly configuring only the section where the primary synchronization signal is detected as the measurement gap section for the MCS by dividing the measurement gap configured as N subframes into two N/2 subframe sections (the first section and the second section) in order to detect the primary synchronization signal of the neighboring BS(s) that is transmitted at an interval of 5 ms (N−1 subframe).

Method 2

Next, method 2 will be described in more detail.

FIG. 11 is a flowchart illustrating another example of a method for configuring a short measurement gap proposed in the present disclosure.

The measurement gap that is currently configured (to a UE) may include two sections, that is, a first section and a second section.

Otherwise, the measurement gap may be classified (or partitioned) into two sections.

Method 2 relates to a method for monitoring the primary synchronization signal of a neighboring BS in the whole sections of the measurement gap that is currently configured first, since a UE may not know in which section (the first section or the second section) of the measurement gap that is currently configured the primary synchronization signal of the neighboring BS (or neighboring cell) is detected.

That is, when the UE identifies the section where the primary synchronization signal is detected in the measurement gap that is currently configured, the UE newly configures only the section where the primary synchronization signal is detected (or identified) as a short measurement section, and notifies that the UE transmits and receives the UL/DL data with a BS in the remaining section where the primary synchronization signal is not detected to the BS.

Particularly, a UE receives the indication information (e.g., half Measurement GAP Indication) indicating that the measurement gap that is currently configured is able to be configured to a short (e.g., half) measurement gap from a (serving) BS (step, S1110).

Later, the UE monitors or measures the primary synchronization signal (PSS) of the neighboring BS(s) in the whole sections of the measurement gap that is currently configured (step, S1120).

Then, when the UE identifies the section where the primary synchronization signal is detected (step, S1130), the UE performs a measurement by shortly configuring the measurement gap as the section where the primary synchronization signal is detected (step, S1140).

In addition, the UE notifies that the UE is to transmit and receive the MCS data in the section where the primary synchronization signal is not detected to the serving BS.

Herein, the UE may notify the information related to the short measurement gap (newly configured or shortly configured) to the serving BS using measurement gap configuration Indication information.

The measurement gap configuration indication information may include the information related to the cause of the measurement gap configuration (e.g., detection of the primary synchronization signal), and the information indicating the position of a newly configured measurement gap, and so on.

In summary, method 2 relates to a method for performing a measurement by newly configuring only the section where the primary synchronization signal is detected as the measurement gap section after dividing the measurement gap configured as N subframes into two N/2 subframe sections (the first section and the second section) and by identifying in which section of the measurement gap the primary synchronization signal is detected first as the same as above, in order to detect the primary synchronization signal that is transmitted at an interval of 5 ms (N−1 subframe).

In this case, for the two methods (method 1 and method 2) described above, when dividing the measurement gap that corresponds to N subframes into N/2 subframe sections, it is preferable to divide each of the two sections into the section that corresponds to four subframes and the section that corresponds to three subframes, respectively, not dividing each of the two sections in the same way, that is, into tree subframes, respectively.

The reason is because there may be occurred the problem that a UE is unable to detect the primary synchronization signal, when the primary synchronization signal of the neighboring BS is transmitted through the third subframe and the fourth subframe of the measurement gap.

This is intended to support a multiple connection method that enables to reserve alternative BSs that may substitute the serving BS quickly even in the case that the channel environment of the serving BS link is degraded, by securing a plurality of alternate BS links in advance by the UE.

That is, the method for configuring a short measurement gap of the first embodiment corresponds to a method for preventing the problem that a UE is unable to perform a UL/DL data transmission and reception with a BS in the corresponding measurement gap owing to the measurement gap for an inter-frequency measurement, when the UE is provided with the MCS that should satisfy low latency/high reliability requirements.

FIG. 12 is a diagram illustrating an example of a short measurement gap configuration proposed in the present disclosure.

FIG. 12 shows the case of dividing the measurement gap that includes six subframes into two or three sections.

In particular, FIG. 12a shows an example of the case that each of the measurement gaps configured with six subframes are divided into four subframes and three subframes, respectively, and FIG. 12b shows an example of the case that the measurement gaps configured with six subframes are divided into three subframes, two subframes and three subframes, respectively.

As shown in FIG. 12, the system frame number (SFN) of each section that is divided may be different from each other.

In addition, a part of the divided each section is configured to be overlapped.

The reason is that a UE may detect it as described above, even though the primary synchronization signal of a neighboring cell is transmitted through the fourth subframe and the fifth subframe of the measurement gap.

Different from FIG. 12a, the measurement gap may be divided into three subframes and four subframes, respectively.

That is, the measurement gap configuration method shown in FIGS. 12a and 12b is just an example, and other various embodiments of dividing the measurement gap into two or more sections may be existed such that only a subframe is overlapped.

FIGS. 13 and 14 illustrate examples of dividing a measurement gap into two sections proposed in the present disclosure.

Herein, each of the divided sections may be expressed by a first section and a second section.

FIG. 13 shows the case that the interval between the first section and the second section is configured to be 10 ms, and the period of the first section and the second section is configured to be 20 subframes, respectively.

FIG. 14 shows the case that the interval between the first section and the second section is configured to be 10 ms, and the period of the first section and the second section is configured to be 40 subframes, respectively.

Second Embodiment: a Method for Configuring a Measurement Gap According to the Mobility State of a UE Next, as another embodiment (the second embodiment proposed in the present disclosure, a method for skipping or shortly configuring (short measurement gap configuring method) the measurement gap that is currently configured by considering a mobile condition or mobility (e.g., mobility state) of a UE in order to satisfy the low latency requirement for a specific service (e.g., MCS) will be described.

The second embodiment relates to a method for changeably configuring the measurement gap that is configured and applied for each UE according to the mobile condition or mobility (e.g., mobility state) of a UE, after the multiple connections are configured between the UE and a BS(s) in order to provide a specific service of new 5G with high service availability.

It is assumed that the measurement gap that is configured for a specific UE is 'N (ms)' and the MCS latency requirement of the corresponding UE is 'D (ms)' (the service that should be arrived in D).

In this case, when it is determined that the channel environment of a UE is not changed abruptly, the UE may transmit and receive the MCS data with a BS that is located within 'D' by not configuring (or skipping) or configuring a short measurement gap (N/2).

The determination that the channel environment of a UE is not changed abruptly may be identified by the mobile condition or mobility of the current UE.

For example, when the current UE is in a normal mobility state or a medium mobility state, it may be determined that the channel environment of the UE is not changed abruptly.

On the contrary, when the current UE is in a high mobility state, it may be determined that the channel environment of the UE is abruptly changed.

Accordingly, in the second embodiment, the measurement gap may be configured as three methods below considering the mobility state of a UE.

Firstly, the first method (method 1), when the mobility state of the UE is normal, relates to a method for the UE to transmit and receive the DL/UL data with a BS in the corresponding measurement gap by disregarding or skipping the measurement gap that is previously configured.

Next, the second method (method 2), when the mobility state of the UE is medium, relates to a method for a UE to configure a short measurement gap using the two methods (method 1 and method 2) described in the first embodiment above, and to transmit and receive DL/UL data with a BS in the remaining section.

Lastly, the third method (method 3), when the mobility state of the UE is high, relates to a method for a UE to maintain or to extend the measurement gap that is previously configured.

FIG. 15 is a flowchart illustrating an example of a method for configuring a measurement gap according to the mobility state of a UE proposed in the present disclosure.

Referring to FIG. 15, a first network node (e.g., MME) transmits a first message that includes the indication information or indicator that instructs to configure the measurement gap changeably according to the mobility state of a UE to a BS (step, S1510).

The indication information (or indicator) may be expressed by the mobility state aware measurement gap configuration indication information.

Herein, the BS may identify to changeably apply the measurement gap that is currently configured according to the mobility state of the UE for a specific service (e.g., MCS) based on the received indication information.

Later, the BS transmits a second message that includes first indication information (or a first indicator) that instructs to report the mobility state of the corresponding UE to the UE (step, S1520).

The first indication information may instruct to report the mobility state of the UE or instruct to report whenever the mobility state of the UE is changed to a specific state (e.g., normal state).

Then, the UE transmits a third message that includes the second indication information that represents the mobility state of its own to the BS (step, S1530).

Here, the UE may transmit the second indication information to the BS when the UE identifies that the transmission time of the MCS data is overlapped with the measurement gap that is currently configured.

Later, the BS determines whether to skip the measurement gap that is configured to the UE or to configure a short measurement gap based on the second indication information that is received from the UE (step, S1540).

That is, the BS determines whether to change a measurement gap configuration based on the second indication information.

Then, the BS transmits a fourth message that includes the determination result to the UE (step, S1550).

Later, the UE skips the measurement gap or configures a short measurement gap based on the received determination result (step, S1560).

Step S1540 will be described in more detail.

Firstly, when the received mobility state of the UE is set to 'normal state', the BS determines to skip or not to apply the measurement gap for the MCS.

And, the BS transmits the fourth message that includes the corresponding result to the UE.

Here, the fourth message may include the system frame number (SFN) information indicating that the UE does not apply the measurement gap.

Accordingly, the UE may transmit and receive the MCS data with the BS, not performing a measurement in the corresponding section based on the SFN information included in the fourth message.

Next, when the received mobility state of the UE is set to 'medium state', the BS determines to configure a short measurement gap for the MCS, and transmits the fourth message that includes the corresponding result to the UE.

Here, the fourth message may include the information related to the short measurement gap.

As an example, the short measurement gap may be set to a half of the previously configured measurement gap.

The information related to the short measurement gap may include the indication information that instructs to configure a short (e.g., a half) measurement gap, the position information that represents a position of the short measurement gap, the interval information that represents an interval of the short measurement gap, the period information that represents a period of the short measurement gap, and so on.

Accordingly, the UE performs a measurement only in the corresponding section based on the information related to the short measurement gap included in the third message.

Hereinafter, various methods for skipping the measurement gap or configuring a short measurement gap in various situations will be described by reference to the accompanying drawings.

FIGS. 16 and 17 are diagrams illustrating examples of a method for skipping the measurement gap that is previously configured proposed in the present disclosure.

FIG. 16 shows a method for notifying skipping of the measurement gap for a low speed mobile UE when an initial access for providing the MCS of low latency/high reliability.

That is, FIG. 16 shows a method in which the measurement gap is not applied for low speed mobile UE (e.g., normal mobility state) in the process that a UE that supports a specific service (e.g., MCS) configures a multiple connection with a plurality of alternative BSs when accessing a network.

The method shown in FIG. 16 may be performed for a serving BS to receive the indicator that instructs to configure a measurement gap changeably according to the mobility of a UE through a network node (e.g., MME) via an Initial Context Setup Request message (step, S1610).

The serving BS that receives the indicator from the network node (MME) identifies to apply a measurement gap changeably according to the mobility of a UE for the MCS received from an S-GW through the corresponding bearer.

Later, the serving BS transmits an RRC Connection Reconfiguration message that includes the indicator that instructs to report a mobility state to the UE (step, S1620).

The indicator that instructs to report a mobility state 1) may mean to report the current mobility state of the UE, or 2) may mean to report whenever the mobility state of the UE is changed to 'normal state'.

Then, the UE that receives the indicator related to the mobility state delivers the indicator that indicates 1) the normal mobility state or 2) the fact of being shifted to the normal mobility state to the serving BS (step, S1630).

Here, the report for the mobility state of UE may be performed when the UE detects that the transmission time of the MCS data is overlapped with the measurement gap that is previously configured.

In addition, the report for the mobility state of UE may be performed before the UE transmits the scheduling request for the resource occupation for a specific MCS to the serving BS.

Later, the serving BS that receives the indicator that indicates the normal mobility state or the fact of being shifted to the normal mobility state from the UE determines not to apply the measurement gap for the MCS data that is delivered through the MCS dedicated bearer that is previously configured.

Here, the timing that the BS determines the measurement gap may not be applied may be the timing of receiving the indicator included in the Initial Context Setup Request message in step S1610.

That is, when the importance or the latency requirement for the DL MCS (data) which may be generated from the timing of receiving the indicator is great, the BS may transmit the DL MCS (data) to the UE even in the case there is no feedback for the mobility of the UE by discarding the measurement gap.

Accordingly, the serving BS notifies the SFN information indicating not to apply the measurement gap to the UE in advance before transmitting the DL data to the UE (step, S1640).

Through this, the UE may transmit and receive the DL/UL MCS data in the corresponding specific measurement gap section without performing the inter-frequency measurement in the specific measurement gap section of the corresponding SFN.

FIG. 17 illustrates an example of a method in which the measurement gap is not applied for low speed mobile UEs (e.g., in normal mobility state) during the process that the UE in an idle state configures a multiple connection with a plurality of alternative BSs when a service is requested.

The method shown in FIG. 17 may be performed by including the UE mobility state or the UE mobility state shift information in an RRC connection request message when a UE in an idle state accesses a network for requesting service.

Particularly, a serving BS that receives an indicator related to the mobility state of a UE from the UE (step, S1710) stores the mobility state of the UE.

Later, the serving BS receives an indicator that instructs to configure a measurement gap changeably according to the mobility of the UE through the Initial Context Setup Request message that is transmitted from a network node (MME) (step, S1720).

The indicator may be express the mobility state of a UE with the mobility state aware measurement gap configuration indication information.

Then, the serving BS is aware of applying the measurement gap changeably according to the UE mobility for the MCS data received from an S-GW through the corresponding bearer.

Accordingly, the serving BS transmits the indicator that indicates to discard the measurement gap that is configured to the UE and the RRC Connection Reconfiguration that includes the SFN information of the measurement gap that is to be discarded (step, S1730).

In the method shown in FIG. 17, since the UE delivers the information on the mobility state of its own to the serving BS through the RRC connection configuration for the MCS service request, different from the method shown in FIG. 16, the serving BS does not instruct a separate feedback for the mobility state to the UE.

Meanwhile, similar to the description by reference to FIG. 16, only for the mobility state shift of a UE, the report on the mobility state of the UE may be performed by the UE before transmitting the scheduling request for the resource occupation of a specific MCS, when the UE is aware that the transmission time of the corresponding MCS is overlapped by the measurement gap that is previously configured.

That is, in step S1710, the serving BS that receives the indicator that indicates a normal mobility state or the fact of being shifted to a normal mobility state from the UE determines that the measurement gap may not be applied to the MCS that is delivered through an MCS dedicated bearer.

Later, the serving BS notifies the SFN information indicating that the measurement gap is not applied before delivering the DL data to the UE (step, S1730).

Accordingly, the UE may receive the DL data or transmit the UL data to the serving BS without performing the inter-frequency measurement in the specific section of the corresponding SFN.

The method shown in FIG. 17 may also be used to transmit the mobility state information for a medium speed mobile UE.

In this case, the RRC Connection Request message includes the UE mobility state information that is configured as 'medium'.

The network node (e.g., MME), as shown in FIG. 17, transmits the indicator that indicates the measurement gap configuration considering the mobility state with being included in the Initial Context Setup request message.

Later, the serving BS that receives the Initial Context Setup request message transmits the information required for a short measurement gap configuration with being included in the RRC Connection Reconfiguration message.

The information required for a short measurement gap configuration includes an indicator that instructs to configure a short measurement gap, the position information of the short measurement gap (the first section or the second section, when the measurement gap is divided into two sections), the interval information between the first section and the second section, the period information of the short measurement gap, and the like.

FIG. 18 is a diagram illustrating an example of a method for configuring a short measurement gap proposed in the present disclosure.

FIG. 18 shows an example of a method for a UE to apply a short measurement gap for medium speed UEs (e.g., medium mobility state) in the process of configuring a multiple connection with a plurality of alternative BSs when accessing a network.

The case shown in FIG. 18 may be performed by receiving the indicator that instructs to configure a measurement gap changeably according to the mobility of a UE through the Initial Context Setup Request message (step, S1810), similar to the case shown in FIG. 16.

Referring to FIG. 18, the serving BS that receives the corresponding indicator from a network node (e.g., MME) is aware of applying the measurement gap changeably according to the UE mobility for the MCS data received from an S-GW through the corresponding bearer.

Later, the serving BS transmits an indicator that instructs to report the mobility state of the UE through the RRC Connection Reconfiguration message (step, S1820).

Here, the indicator that instructs to report the mobility state of the UE may have the same meaning described in FIG. 16.

Then, the UE transmits the indicator that indicates 1) the medium mobility state or 2) the fact of being shifted to the medium mobility state to the serving BS (step, S1830).

The report on the mobility state of the UE, similar to the description by reference to FIG. 16, may be performed when the UE is aware that the transmission time of the corresponding MCS data is overlapped with the measurement gap that is previously configured, before the UE transmits the scheduling request for the resource occupation for a specific MCS.

Later, the serving BS determines that a short measurement gap may be applied to the MCS data that is transmitted through the dedicated bearer that is previously configured.

As described by reference to FIG. 16, the time of determining that the BS may not apply the measurement gap may be the time of receiving the indicator included in the Initial Context Setup Request message from the MME.

That is, when the importance or the latency requirement for the DL MCS (data) that may be generated from the time of receiving the indicator is great, the BS may transmit the DL MCS (data) to the UE even in the case there is no feedback for the mobility of the UE by discarding the measurement gap.

And, the serving BS notifies the information for applying the measurement gap to the UE before transmitting the DL data to the UE (step, S1840).

Accordingly, the UE transmits the DL/UL data without performing an inter-frequency measurement in the remaining section except the short measurement gap based on the information for applying the short measurement gap.

Here, the information required for a short measurement gap configuration includes the indicator that instructs to configure a short measurement gap, the position information of the short measurement gap (the first section or the second section, when the measurement gap is divided into two sections), the interval information between the first section and the second section, the period information of the short measurement gap, and the like.

The purport of transmitting the information required for the short measurement gap configuration is to avoid the situation of not available to detect the primary synchronization signal of a neighboring BS by configuring the period of a measurement gap much shorter, when the cell environment of surroundings is changed according to the movement of a user.

FIGS. 19 and 20 are flowcharts illustrating other examples of a method for skipping the measurement gap that is previously configured proposed in the present disclosure.

Particularly, FIG. 19 shows an example of a method for a UE not to apply a measurement gap for low speed mobile UE (e.g., normal mobility state) in the process of configuring a multiple connection with a plurality of alternative BSs based on an MME instruction when the UE configures the dedicated bearer for the MCS.

Referring to FIG. 19, a serving BS is aware that the dedicated bearer for the MCS is configured from a network node (MME), and transmits an indicator that instructs to report a mobility state of the UE through an RRC Connection Reconfiguration message to the UE (step, S1910).

Later, the UE transmits the indicator that indicates 1) the normal mobility state or 2) the fact of being shifted to the normal mobility state to the serving BS (step, S1920).

Then, the serving BS determines not to apply the measurement gap for the MCS data transmitted through the MCS dedicated bearer that is previously configured.

And, the serving BS notifies the SFN information indicating not to apply the measurement gap to the UE before transmitting the DL data to the UE (step, S1930), and let the UE may transmit and receive the DL/UL MCS data without performing the inter-frequency measurement in the specific measurement gap section of the corresponding SFN.

FIG. 20 illustrates another example of a method not to apply a measurement gap for a low speed mobile UEs (e.g., in normal mobility state) during the process that the UE in an idle state configures a multiple connection with a plurality of alternative BSs based on an MME instruction when the UE configures a dedicated bearer for the MCS.

Similar to the method shown in FIG. 19, a serving BS is aware that the dedicated bearer for the MCS is configured from a network node (e.g., MME), and transmits the indicator that instructs to report a mobility state of the UE through an RRC Connection Reconfiguration message to the corresponding UE (step, S2010).

Later, the UE transmits the indicator that specifies 1) the normal mobility state or 2) the fact of being shifted to the normal mobility state to the serving BS (step, S2020).

Then, the serving BS that receives the indicator that indicates the normal mobility state or the fact of being shifted to the normal mobility state from the UE determines not to apply the measurement gap for the MCS data that is delivered through the MCS dedicated bearer that is previously configured.

And, the serving BS notifies the information (the start time of the DL data, the scheduling period of the DL data, the traffic pattern of the DL data, etc.) indicating not to apply the measurement gap before transmitting the DL data to the UE (step, S2030), and let the UE may receive the DL MCS data without performing the inter-frequency measurement in the measurement gap in a specific section according to the corresponding information.

FIG. 21 is a diagram illustrating another example of a method for configuring a short measurement gap proposed in the present disclosure.

FIG. 21 shows an example of a method for a UE to apply a short measurement gap for medium speed UEs (e.g., medium mobility state) in the process of configuring a multiple connection with a plurality of alternative BSs based on an MME instruction when configuring the dedicated bearer for the MCS for a (MCS) UE.

The serving BS, after being aware that the dedicated bearer is configured from the MME, transmits the indicator that instructs to report the mobility state of the UE through the RRC Connection Reconfiguration message (step, S2110).

Later, the UE transmits the indicator that specifies 1) the medium mobility state or 2) the fact of being shifted to the medium mobility state to the serving BS (step, S2120).

The report on the mobility state, similar to the description by reference to FIG. 16, may be performed when the UE is aware that the transmission time of the MCS is overlapped with the measurement gap that is previously configured.

Then, the serving BS that receives the indicator that specifies the medium mobility state or the fact of being shifted to the medium mobility state from the UE determines whether the short measurement gap may be applied for the MCS, which is delivered through the MCS dedicated bearer that is previously configured.

And, the serving BS negotiates to configure and apply the short measurement gap with the UE before transmitting the DL data to the UE (step, S2130).

Later, the serving BS makes the UE receive the DL data or transmit the UL data without performing the inter-frequency measurement in the measurement gap in a specific section.

FIG. 22 is a flowchart illustrating a method for changing a measurement gap configuration according to a request of UE proposed in the present disclosure.

FIG. 22 shows an example of a method for a UE, which is to be provided with a low latency service to autonomously change a measurement gap configuration.

Particularly, in order for a UE to be provided with a low latency MCS in an RRC connected state always, the UE transmits the indication information that specifies the position where the primary synchronization signal of a neighboring BS is detected in the measurement gap section that is previously configured, the mobility state of its own or the state shift of the mobility state.

Through this, the UE may be provided with the low latency MCS by discarding the measurement gap that is previously configured or configuring the measurement gap of short section.

According to the procedure shown in FIG. 22, the UE detects the primary synchronization signal of a neighboring BS (or neighboring cell) in the $0^{th}$ and fourth SFNs of the sixth subframes of the measurement gap section that is previously configured.

FIG. 23 is a diagram illustrating an example of a measurement gap configuration change proposed in the present disclosure.

FIG. 23 will be described in more detail.

First, a UE detects the primary synchronization signal of a neighboring BS through the measurement gap that is currently configured (step, S2210).

Later, when the UE determines that it is required to provide the low latency service, the UE transmits the information related to the position of the primary synchronization signal of a detected neighboring BS, the mobility state of its own or the state shift of the mobility state (e.g., normal mobility state) and the intention to be provided with the low latency service in the measurement gap that is previously configured to a serving BS (step, S2220).

Then, the UE receives the information (the information that instructs to skip the measurement gap, the SFN information to which the measurement gap skip is applied, etc.) related to the measurement gap skip that is previously configured from the serving BS (step, S2230).

After step S2230, the UE may discard or skip the measurement gap that is previously configured, and may be provided with the low latency service in the corresponding measurement gap.

Later, when the UE determines that it is not required to provide the low latency service, the UE transmits the indicator for requesting the measurement gap resume that is skipped above to the serving BS (step, S2240).

That is, the UE notifies to perform the Inter-Frequency Measurement that was skipped for providing the low latency service again to the serving BS.

Later, when the UE determines that it is required to provide the low latency service again, the UE transmits the information related to the position of the primary synchronization signal of a detected neighboring BS, the mobility state of its own or the state shift of the mobility state (e.g., normal mobility state) to a serving BS (step, S2250).

Then, the UE receives the information related to the short measurement gap configuration from the BS (step, S2260).

Later, the UE configures the short measurement gap, and performs the measurement through the short measurement gap.

In addition, the UE may transmit and receive the data of low latency service with the serving BS through the remaining section except the short measurement gap in the measurement gap that is previously configured.

FIG. 24 is a diagram illustrating another example of a method for configuring a short measurement gap proposed in the present disclosure.

When configuring and applying the measurement gap of a shorter section than the measurement gap section that is previously configured to the UE according to the mobility state of the UE, in the short measurement gap, consecutive N subframes may be configured based on the subframe index on which the primary synchronization signal of a neighboring BS is detected in the measurement gap that is previously configured.

The number, N is smaller than the number of consecutive subframes included in the measurement gap that is previously configured.

For example, in the case that the subframe index on which the primary synchronization signal is detected in the previous measurement gap (the measurement gap that is previously configured) is P, the short measurement gap section may be configured by consecutive 2L+1 (=N) subframes such as {P−L, P−(L+1), . . . , P, P+1, P+L}.

In addition, in the case that a part of the subframes of the short measurement gap in the above example includes the subframe(s) before the first subframe of the measurement gap that is previously configured or the subframe(s) after the last subframe, it is also possible to configure the short measurement gap by non-consecutive 2L+1 subframe as below cases (1) and (2).

Here, it is assumed that the subframe index that includes the measurement gap that is previously configured is {N, N+1, . . . N+M−1}.

Here, M is 6, N represents the subframe index on which the measurement gap that is previously configured is started, and P represents the subframe index on which PSS is detected.

(1) If P−L<N, the short measurement gap={N, N+1, . . . P+L}∪{P−L+M, . . . N+M−1}

(2) If P+L>N+M−1, the short measurement gap={N, N+1, . . . P+L−M}∪{P−L, . . . N+M−1}

As shown in FIG. 24, the measurement gap 2410 that is previously configured includes six subframes from subframe #0 to subframe #5, and the PSS 2420 of a neighboring BS is detected in subframe #0.

In addition, when the short measurement gap is configured by three subframes with subframe #0 on which the PSS is detected being centered (2430), since the subframe located in the left side of subframe #0 is not included in the measurement gap that is previously configured, following the case (1), the subframe located in the left side of subframe #0 is configured as the last subframe (subframe #5) of the measurement gap that is previously configured.

In this case, the short measurement gap is non-consecutively configured as subframe #0, subframe #1 and subframe #5 (2440).

FIG. 24 shows the short measurement gap that is non-consecutively configured according to the example above.

FIG. 25 is a block diagram illustrating a wireless device in which the methods proposed in the present disclosure may be implemented.

Here, the wireless device may be a network entity, a BS, a UE, and the like, and the BS includes both a macro BS and a small BS.

As shown in FIG. 25, the UE 10 and the BS 20 include a processors 2511 and 2521, memories 2512 and 2522, and RF units (transmitting/receiving units, communication units 2513 and 2523).

The BS and the UE may further include input units and output units.

The RF units 2513 and 2523, the processors 2511 and 2521, the input units and output units, and the memories 2512 and 2522 are operatively connected with each other in order to perform the methods as proposed in the present disclosure.

The RF units 2513 and 2523 receive the information created from a PHY (Physical Layer) protocol, transfer the received information through RF (Radio Frequency) spectrums and conduct filtering and amplification, then transmit the results through antennas. Further, the communication units transfer RF (Radio Frequency) signals received through the antennas to bands processable by the PHY protocol and perform filtering.

However, the communication units may also include the functions of switches to switch transmitting and receiving functions.

The processors 2511 and 2521 implement functions, procedures, and/or methods as proposed herein. The layers of radio interface protocols may be implemented by the processors.

The processors may be represented as control parts, controllers, control units, or computers.

The memories 2512 and 2522 are connected with the processors to store protocols or parameters for performing the method proposed in the present disclosure.

The processor 2511 and 2521 may include an application-specific integrated circuit (ASIC), a separate chipset, a logic circuit, and/or a data processing unit. The memory may include a read-only memory (ROM), a random access memory (RAM), a flash memory, a memory card, storage medium, and/or other equivalent storage devices. The communication unit may include a base-band circuit for processing a radio signal. When the embodiment of the present invention is implemented in software, the aforementioned methods can be implemented with a module (i.e., process, function, etc.) for performing the aforementioned functions.

The module may be stored in the memory and may be performed by the processor. The memory may be located inside or outside the processor, and may be coupled to the processor by using various well-known means.

The output unit (display unit) is controlled by the processor and outputs information from the process, together with various information signals from the processor and key input signals generated from the key input unit.

Further, although the drawings have been individually described for ease of description, the embodiments shown in the drawings may be merged with each other to implement new embodiments. As necessary by one of ordinary skill, designing recording media readably by a computer recording programs to execute the above-described embodiments also belongs to the scope of the present invention.

The elements and the method described in the embodiments are not limitedly applied to the method proposed in the present disclosure, but the whole or a part of each of the embodiments may be selectively constructed so as to form various modifications.

Meanwhile, the method as proposed herein may be implemented as processor-readable codes in a recording medium that may be read by a processor provided in a network device. The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet.

Further, the recording media readable by the processor may be distributed to computer systems connected with each other via a network, and processor readable codes may be stored and executed in a distributing manner It will be apparent to those skilled in the art that various substitutions, modifications and variations can be made in the present invention described so far, without departing from the spirit or scope of the inventions by those skilled in the art, and therefore, the present invention is not limited to the described embodiments and the accompanying drawings.

The data transmission and reception method in a wireless communication system of the present invention has been described mainly with the example applied to 3GPP LTE/LTE-A system, but may also be applied to various wireless communication systems except the 3GPP LTE/LTE-A system.

What is claimed is:

1. A method for transmitting and receiving data in a wireless communication system, the method performed by a user equipment (UE) and comprising:
    performing a measurement in a measurement gap;
    receiving first indication information from a base station (BS) that instructs reporting a mobility state of the UE;
    transmitting second indication information to the BS that reports the mobility state;
    receiving control information from the BS related to a configuration change of the measurement gap; and
    transmitting and receiving data with the BS for a mission critical service (MCS) instead of transmitting a measurement report to the BS,
    wherein the data is transmitted and received in the entire measurement gap or in a specific portion of the entire measurement gap based on the received control information.

2. The method of claim 1, wherein the mobility state is a current mobility state of the UE or a changed mobility state of the UE.

3. The method of claim 1, wherein the received control information is configured based on the transmitted second indication information.

4. The method of claim 1, wherein the mobility state is a normal mobility state, a medium mobility state or a high mobility state.

5. The method of claim 1, wherein the received control information includes at least information that instructs to skip the measurement gap or information that represents a system frame number (SFN) of the skipped measurement gap when the UE transmits and receives the data.

6. The method of claim 1, wherein the received control information includes at least position information representing a position of a short measurement gap, interval information representing an interval of the short measurement gap or period information representing a period of the short measurement gap.

7. The method of claim 1, further comprising transmitting information to the BS representing that the MCS is available.

8. The method of claim 1, wherein:
    the measurement gap includes a first portion and a second portion; and
    the specific portion is either the first portion or the second portion.

9. The method of claim 8, further comprising:
    checking whether to detect a primary synchronization signal (PSS) of a neighboring BS in the first portion of the measurement gap; and
    transmitting information to the BS to configure the first portion as a short measurement gap when the PSS is detected in the first portion,
    wherein the specific portion is the second portion.

10. The method of claim 8, wherein the first portion is half the measurement gap.

11. The method of claim 8, further comprising:
    checking whether to detect a primary synchronization signal (PSS) of a neighboring BS in the first portion; and
    transmitting information to the BS to configure the second portion as a short measurement gap when the PSS is detected in the first portion,
    wherein the specific portion is the first portion.

12. The method of claim 8, wherein the first portion and the second portion overlap.

13. A method for transmitting and receiving data in a wireless communication system, the method performed by a base station (BS) and comprising:
    receiving a control message from a network entity that indicates a measurement gap configuration based on a mobility state;
    transmitting first indication information to a user equipment (UE) that instructs reporting a mobility state of the UE;
    receiving second indication information from the UE that reports the mobility state;
    changing a configuration of the measurement gap based on the received second indication information;
    transmitting control information to the UE related to the changed configuration of the measurement gap; and
    transmitting and receiving data with the UE for a mission critical service (MCS) instead of receiving a measurement report from the UE,
    wherein the data is transmitted and received in the entire measurement gap or in a specific portion of the entire measurement gap.

14. The method of claim 13, further comprising receiving information from the UE indicating that the MCS is available.

15. The method of claim 13, wherein the mobility state is a current mobility state of the UE or a changed mobility state of the UE.

16. The method of claim 13, wherein the received control information is configured based on the transmitted second indication information.

17. The method of claim 13, wherein the received control information includes at least position information representing a position of a short measurement gap, interval information representing an interval of the short measurement gap or period information representing a period of the short measurement gap.

18. The method of claim 13, wherein:
the measurement gap includes a first portion and a second portion; and
the specific portion is either the first portion or the second portion.

19. A user equipment (UE) for transmitting and receiving data in a wireless communication system, the UE comprising:
- a radio frequency (RF) unit configured to transmit and receive a radio signal; and
- a processor functionally connected to the RF unit and configured to:
- perform a measurement in a measurement gap;
- control the RF unit to receive first indication information from a base station (BS) that instructs reporting a mobility state of the UE;
- control the RF unit to transmit second indication information to the BS that reports the mobility state;
- control the RF unit to receive control information from the BS related to a configuration change of the measurement gap; and
- control the RF unit to transmit and receive data with the BS for a mission critical service (MCS) instead of transmitting a measurement report to the BS,
- wherein the data is transmitted and received in the entire measurement gap or in a specific portion of the entire measurement gap based on the received control information.

20. A base station (BS) for transmitting and receiving data in a wireless communication system, the BS comprising:
- a radio frequency (RF) unit configured to transmit and receive a radio signal; and
- a processor functionally connected to the RF unit and configured to:
- control the RF unit to receive a control message from a network entity that indicates a measurement gap configuration based on a mobility state;
- control the RF unit to transmit first indication information to a user equipment (UE) that instructs reporting a mobility state of the UE;
- control the RF unit to receive second indication information from the UE that reports the mobility state;
- change a configuration of the measurement gap based on the received second indication information;
- control the RF unit to transmit control information to the UE related to the changed configuration of the measurement gap; and
- control the RF unit to transmit and receive data with the UE for a mission critical service (MCS) instead of receiving a measurement report from the UE,
- wherein the data is transmitted and received in the entire measurement gap or in a specific portion of the entire measurement gap.

* * * * *